US012689132B2

(12) United States Patent
Alkhateeb et al.

(10) Patent No.: US 12,689,132 B2
(45) Date of Patent: Jul. 21, 2026

(54) LARGE INTELLIGENT SURFACES WITH SPARSE CHANNEL SENSORS

(71) Applicant: ARIZONA BOARD OF REGENTS ON BEHALF OF ARIZONA STATE UNIVERSITY, Scottsdale, AZ (US)

(72) Inventors: Ahmed Alkhateeb, Chandler, AZ (US); Abdelrahman Taha, Tempe, AZ (US); Muhammed Alrabeiah, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 376 days.

(21) Appl. No.: 18/342,181

(22) Filed: Jun. 27, 2023

(65) Prior Publication Data

US 2023/0352847 A1 Nov. 2, 2023

Related U.S. Application Data

(62) Division of application No. 16/901,899, filed on Jun. 15, 2020, now Pat. No. 11,728,571.

(Continued)

(51) Int. Cl.
*H01Q 15/14* (2006.01)

(52) U.S. Cl.
CPC ................................ *H01Q 15/148* (2013.01)

(58) Field of Classification Search
CPC ............... H04Q 15/148; H04Q 15/002; H04Q 15/0086; H04Q 15/02; H01Q 15/14;

(Continued)

(56) References Cited

U.S. PATENT DOCUMENTS

| | | | |
|---|---|---|---|
| 7,920,069 | B2 | 4/2011 | Shain et al. |
| 9,453,905 | B2 | 9/2016 | Smith |

(Continued)

FOREIGN PATENT DOCUMENTS

| | | |
|---|---|---|
| WO | 2017216745 A1 | 12/2017 |

OTHER PUBLICATIONS

Durrant-Whyte, H., et al., "Simultaneous Localization and Mapping: Part I," IEEE Robotics & Automation Magazine, vol. 13, No. 2, Jun. 2006, IEEE, pp. 99-108.

(Continued)

*Primary Examiner* — Lester G Kincaid

(74) *Attorney, Agent, or Firm* — MH2 Technology Law Group, LLP

(57) ABSTRACT

Large intelligent surfaces (LISs) with sparse channel sensors are provided. Embodiments described herein provide efficient solutions for these problems by leveraging tools from compressive sensing and deep learning. Consequently, an LIS architecture based on sparse channel sensors is provided where all LIS elements are passive reconfigurable elements except for a few elements that are active (e.g., connected to baseband). Two solutions are developed that design LIS reflection matrices with negligible training overhead. First, compressive sensing tools are leveraged to construct channels at all the LIS elements from the channels seen only at the active elements. These full channels can then be used to design the LIS reflection matrices with no training overhead. Second, a deep learning-based solution is deployed where the LIS learns how to optimally interact with the incident signal given the channels at the active elements, which represent the current state of the environment and transmitter/receiver locations.

20 Claims, 17 Drawing Sheets

Related U.S. Application Data

(60) Provisional application No. 62/873,551, filed on Jul. 12, 2019.

(58) Field of Classification Search
CPC ............... H01Q 15/148; H01Q 15/002; H01Q 15/0086; H01Q 15/02; H04B 7/04013; H04B 7/04026
See application file for complete search history.

(56) References Cited

U.S. PATENT DOCUMENTS

| | | | | |
|---|---|---|---|---|
| 10,395,539 | B2 | 8/2019 | Slutsky et al. | |
| 10,469,619 | B2 | 11/2019 | Shimizu et al. | |
| 2003/0016737 | A1 | 1/2003 | Wu et al. | |
| 2007/0198227 | A1 | 8/2007 | Dundar et al. | |
| 2011/0244786 | A1* | 10/2011 | Fujii | H01Q 19/104 455/7 |
| 2013/0194127 | A1 | 8/2013 | Ishihara et al. | |
| 2015/0111597 | A1 | 4/2015 | Lavery | |
| 2016/0146945 | A1 | 5/2016 | Kamijo et al. | |
| 2016/0359230 | A1* | 12/2016 | Wang | H01Q 21/22 |
| 2017/0006436 | A1 | 1/2017 | Ahmed et al. | |
| 2017/0047663 | A1* | 2/2017 | Hall | G01S 7/38 |
| 2017/0255360 | A1 | 9/2017 | Hsieh et al. | |
| 2017/0287334 | A1 | 10/2017 | Slutsky et al. | |
| 2018/0316090 | A1* | 11/2018 | Foo | H01Q 15/002 |
| 2019/0044246 | A1 | 2/2019 | Pitsillides et al. | |
| 2019/0101638 | A1 | 4/2019 | Vu et al. | |
| 2019/0318146 | A1 | 10/2019 | Trichopoulos et al. | |
| 2019/0327625 | A1 | 10/2019 | Patel et al. | |
| 2020/0005385 | A1 | 1/2020 | Stout et al. | |
| 2020/0005911 | A1 | 1/2020 | Brooks et al. | |
| 2020/0025911 | A1 | 1/2020 | Rappaport | |
| 2020/0028262 | A1* | 1/2020 | Fang | H01Q 3/46 |
| 2020/0132826 | A1 | 4/2020 | Achour | |
| 2020/0136718 | A1 | 4/2020 | Fang | |
| 2020/0163040 | A1 | 5/2020 | Trichopoulos et al. | |
| 2020/0250409 | A1 | 8/2020 | Hu | |
| 2021/0384637 | A1 | 12/2021 | Sciancalepore et al. | |

OTHER PUBLICATIONS

Faisal et al., "Ultra-Massive MIMO Systems at Terahertz Bands: Prospects and Challenges," arXiv eprint, arXiv:1902.11090v1 [eess. SP], Feb. 28, 2019, 7 pages, https://arxiv.org/pdf/1902.11090v1.pdf.
Foo, S., "Liquid-crystal Reconfigurable Metasurface Reflectors," 2017 IEEE International Symposium on Antennas and Propagation & USNC/URSI National Radio Science Meeting, Jul. 9-14, 2017, San Diego, CA, pp. 2069-2070.
Notice of Allowance for U.S. Appl. No. 16/684,746, mailed Jan. 6, 2021, 9 pages.
Guidi, F., et al., "Personal Mobile Radars with Millimeter-Wave Massive Arrays for Indoor Mapping," IEEE Transactions on Mobile Computing, vol. 15, No. 6, Jun. 2016, IEEE, pp. 1471-1484.
Heath et al., "An Overview of Signal Processing Techniques for Millimeter Wave MIMO Systems," IEEE Journal of Selected Topics in Signal Processing, vol. 10, No. 3, Feb. 8, 2016, pp. 436-453.
Hornik et al., "Multilayer Feedforward Networks are Universal Approximators," Neural Networks, vol. 2, No. 5, 1989, pp. 359-366.
Hu et al., "Beyond Massive MIMO: The Potential of Data Transmission With Large Intelligent Surfaces," IEEE Transactions on Signal Processing, vo. 66, No. 10, Mar. 19, 2018, pp. 2746-2758.
Huang et al., "Large Intelligent Surfaces for Energy Efficiency in Wireless Communication," arXiv eprint, arXiv:1810.06934v1 [cs. IT], Oct. 16, 2018, <https://arxiv.org/abs/1810.06934v1>.
Huang et al., "Reconfigurable Intelligent Surfaces for Energy Efficiency in Wireless Communication," IEEE Transactions on Wireless Communications, vol. 18, No. 8, Jun. 19, 2019, pp. 4157-4170.
Hum et al., "Reconfigurable Reflectarrays and Array Lenses for Dynamic Antenna Beam Control: A Review," IEEE Transactions on Antennas and Propagation, vol. 62, No. 1, Oct. 25, 2013, pp. 183-198.
Hur et al., "Millimeter Wave Beamforrning for Wireless Backhaul and Access in Small Cell Networks," IEEE Transactions on Communications, vol. 61, No. 10, Sep. 16, 2013, pp. 4391-4403.
Jung et al., "Performance Analysis of Large Intelligent Surfaces {LISs): Asymptotic Data Rate and Channel Hardenin 1 Effects," arXiv eprint, arXiv:1810.05667v1 [cs.IT], Oct. 12, 2018, 30 pages, https://arxiv.org/pdf/1810.05667v1 .pdf.
Kanhere, O., et al., "Map-Assisted Millimeter Wave Localization for Accurate Position Location," 2019 IEEE Global Communications Conference, Dec. 2019, IEEE, pp. 1-6.
Kanhere, 0., et al., "Position Locationing for Millimeter Wave Systems," 2018 IEEE Global Communications Conference, Dec. 2018, pp. 1-6.
Lecun et al., "Efficient BackProp," Neural Networks: Tricks of the Trade, 2nd edition, Springer-Verlag Berlin Heidelberg, 2012, pp. 9-48.
Lee et al., "Exploiting Spatial Sparsity for Estimating Channels of Hybrid MIMO Systems in Millimeter Wave Communications," 2014 IEEE Global Communications Conference, Dec. 8-12, 2014, Austin, TX, pp. 3326-3331.
Lemic, F., et al., "Localization as a Feature of mmWave Communication," 2016 International Wireless Communications and Mobile Computing Conference (IWCMC), Sep. 2016, IEEE, pp. 1033-1038.
Li et al., Generative Adversarial Estimation of Channel Covariance in Vehicular Millimeter Wave Systems, 2018 52nd Asilomar Conference on Signals, Systems, and Computers, IEEE, Oct. 28-31, 2018, Pacific Grove, CA, pp. 1572-1576.
Liaskos et al., "A new wireless communication paradigm through software-controlled metasurfaces," IEEE Communications Magazine, vol. 56, No. 9, Sep. 17, 2018, pp. 162-169.
Lim et al., "A 100 MS/s, 10.5 Bil, 2.46 mW Comparatorless Pipeline ADC Using Self-biased Ring Amplifiers," IEEE Journal of Solid-Slate Circuits, vol. 50, No. 10, Jul. 27, 2015, pp. 2331-2341.
Maletic, N., et al., "Device Localization Using mmWave Ranging with Sub-6-Assisled Angle of Arrival Estimation," 2018 IEEE International Symposium on Broadband Multimedia Systems and Broadcasting (BMSB), Jun. 2018, IEEE, 6 pages.
Mendez-Rial et al., "Hybrid MIMO Architectures for Millimeter Wave Communications: Phase Shifters or Switches?" IEEE Access, vol. 4, Jan. 1, 2016, pp. 247-267.
Mo et al., "Hybrid Architectures with Few-bit ADC Receivers: Achievable Rates and Energy-rate Tradeoffs," IEEE Transactions on Wireless Communications, vol. 16, No. 4, Mar. 13, 2017, pp. 2274-2287.
Murmann, B., "ADC Performance Survey 1997-2020," updated Oct. 3, 2023, 18 pages [retrieved on Dec. 28, 2023]. Retrievedfrom the Internet: <URL: https://github.com/bmurmann/ADC-survey>.
Nadeem et al., "Large Intelligent Surface Assisted MIMO Communications," arXiv eprint, arXiv: 1903.08127v1 [cs.IT], Mar. 19, 2019, 37 pages, https://arxiv.org/pdf/1903.08127v1.pdf.
O'Toole, M., et al., "Confocal non-line-of-sight imaging based on the light-cone transform," Nature, vol. 555, No. 7696, Mar. 2018, Macmillan Publishers Limited, pp. 338-341.
Pal et al., "Nested Arrays: A Novel Approach to Array Processing With Enhanced Degrees of Freedom," IEEE Transactions on Signal Processing, vol. 58, No. 8, Apr. 29, 2010, pp. 4167-4181.
Palacios, J., et al., "Communication-Driven Localization and Mapping for Millimeter Wave Networks," IEEE Conference on Computer Communications (IEEE INFOCOM 2018), Apr. 2018, IEEE, pp. 2402-2410.
Palacios, J., et al., "JADE: Zero-Knowledge Device Localization and Environment Mapping for Millimeter Wave Systems," IEEE INFOCOM 2017—IEEE Conference on Computer Communications, May 1-4, 2017, Atlanta, GA, IEEE, 9 pages.
Puglielli et al., "A Scalable Massive MIMO Array Architecture Based on Common Modules," 2015 IEEE Intemational Conference on Communication Workshop (ICCW), Jun. 8-12, 2015, London, UK, pp. 1310-1315.
Rappaport et al., "Broadband Millimeter-Wave Propagation Measurements and Models Using Adaptive-Beam Antennas for Outdoor

(56) References Cited

OTHER PUBLICATIONS

Urban Cellular Communications," IEEE Transactions on Antennas and Propagation, vol. 61, No. 1, Dec. 20, 2012, pp. 1850-1859.
Rappaport, T. S., et al., "Small-Scale, Local Area, and Transitional Millimeter Wave Propagation for 5G Communications," IEEE Transactions on Antennas and Propagation, vol. 65, No. 12, Dec. 2017, IEEE, pp. 6474-6490.
Remcom, "Wireless InSite 3D Wireless Prediction Software," May 29, 2020, <https://web.archive.org/web/20200529093755/http://www.remcom.com/wireless-insite-em-propagation-software/>.
Reitmayr, G., et al., "Simultaneous Localization and Mapping for Augmented Reality," 2010 International Symposium on Ubiquitous Virtual Reality, Jul. 7-10, 2010, Gwangju, South Korea, IEEE, pp. 5-8.
Rusu et al., "Algorithms for the Construction of Incoherent Frames under Various Design Constraints," Signal Processing, European Association for Signal Processing (EURASIP), vol. 152, Jun. 21, 2018, 2018, pp. 363-372.
Intemational Search Report and Written Opinion for International Patent Application No. PCT/US2021/036953, mailed Sep. 16, 2021, 19 pages.
Basar, E. et al., "Wireless Communications Through Reconfigurable Intelligent Surfaces," IEEE Access, vol. 7, Aug. 13, 2019, IEEE, 21 pages.
Björnson, E. et al., "Power Scaling Laws and Near-Field Behaviors of Massive MIMO and Intelligent Reflecting Surfaces," IEEE Open Journal of the Communications Society, Sep. 2020, IEEE, 19 pages.
Björnson, E. et al., "Intelligent Reflecting Surface vs. Decode-and-Forward: How Large Surfaces Are Needed to Beat Relaying?" IEEE Wireless Communications Letters, vol. 9, Issue 2, Feb. 2020, IEEE, 5 pages.
Larsson, E.G. et al., "Massive MIMO for Next Generation Wireless Systems," IEEE Communications Magazine, vol. 52, No. 2, Feb. 2014, IEEE, pp. 186-195.
Lu, L. et al., "An Overview of Massive MIMO: Benefits and Challenges," IEEE Journal of Selected Topics in Signal Processing, vol. 8, Issue 5, Oct. 2014, IEEE, 18 pages.
Marzetta, T., "Noncooperative cellular wireless with unlimited numbers of base station antennas," IEEE Transactions on Wireless Communications, vol. 9, No. 11, Nov. 2010, IEEE, pp. 3590-3600.
Renzo, M.D. et al., "Reconfigurable Intelligent Surfaces vs. Relaying: Differences, Similarities, and Performance Comparison," IEEE Open Journal of the Communications Society, vol. 1, Jun. 2020, IEEE, pp. 798-807.
Renzo, M.D. et al., "Smart Radio Environments Empowered by Reconfigurable Intelligent Surfaces: How It Works, State of Research, and The Road Ahead," IEEE Journal on Selected Areas in Communications, vol. 38, Issue 11, Nov. 2020, IEEE, pp. 2450-2525.
Roh, W. et al., "Millimeter-wave beamforming as an enabling technology for 5G cellular communications: ," IEEE Communications Magazine, vol. 52, Issue 2, Feb. 2014, IEEE, pp. 106-113.
Taha, A. et al., "Deep Reinforcement Learning for Intelligent Reflecting Surfaces: Towards Standalone Operation," IEEE 2020 IEEE 21st International Workshop on Signal Processing Advances in Wireless Communications (SPAWC), May 26-29, 2020, Atlanta, GA, USA, IEEE, 5 pages.
Taha, A. et al., "Enabling Large Intelligent Surfaces with Compressive Sensing and Deep Leaming," arXiv:1904.10136v2 [cs.IT], Apr. 30, 2019, 33 pages.
Samimi et al., "Ultra-Wideband Statistical Channel Model for Non Line of Sight Millimeter-wave Urban Channels," 2014 IEEE Global Communications Conference, Dec. 8-12, 2014, Austin, TX, pp. 3483-3489.
Sanguinetti et al., "Towards Massive MIMO 2.0: Understanding Spatial Correlation, Interference Suppression, and Pilot Contamination," arXiv eprint, arXiv:1904.03406v1 [eess.SP], Apr. 6, 2019, 25 pages, https://arxiv.org/pdf/1904.03406v1.pdf.
Setlur, P., et al., "Multipath Exploitation in Non-LOS Urban Synthetic Aperture Radar," IEEE Journal of Selected Topics in Signal Processing, vol. 8, No. 1, Feb. 2014, IEEE, pp. 137-152.
Shahmansoori, A., et al., "Position and Orientation Estimation Through Millimeter-Wave MIMO in 5G Systems," IEEE Transactions on Wireless Communications, vol. 17, No. 3, Mar. 2018, IEEE, pp. 1822-1835.
Sheen, D., et al., "Three-Dimensional Millimeter-Wave Imaging for Concealed Weapon Detection," IEEE Transactions on Microwave Theory and Techniques, vol. 49, No. 9, Sep. 2001, IEEE, pp. 1581-1592.
Sume, A., et al., "Radar Detection of Moving Targets Behind Comers," IEEE Transactions on Geoscience and Remote Sensing, vol. 49, No. 6, Jun. 2011, IEEE, pp. 2259-2267.
Tan et al., "Direction of Arrival Estimation Using Co-Prime Arrays: A Super Resolution Viewpoint," IEEE Transactions on Signal Proceedings, vol. 62, No. 21, Sep. 4, 2014, pp. 5565-5576.
Tan et al., "Enabling indoor mobile millimeter-wave networks based on smart reflect-arrays," IEEE INFOCOM 2018—IEEE Conference on Computer Communications, Apr. 16-19, 2018, Honolulu, HI, 9 pages.
Thai, K., et al., "Around-the-Corner Radar: Detection and Localization of a Target in Non-Line of Sight," 2017 IEEE Radar Conference (RadarConf), May 2017, IEEE, pp. 0842-0847.
Trichopoulos, G. C., et al., "A Broadband Focal Plane Array Camera for Real-time THz Imaging Applications," IEEE Transactions on Antennas and Propagation, vol. 61, No. 4, Apr. 2013, IEEE, pp. 1733-1740.
Tropp, J., "Greed is Good: Algorithmic Results for Sparse Approximation," IEEE Transactions on Information Theory, vol. 50, No. 10, Sep. 27, 2004, pp. 2231-2242.
Velten, A., et al., "Recovering three-dimensional shape around a comer using ultrafast time-of-flight imaging," Nature communications, vol. 3, Mar. 2012, Macmillan Publishers Limited, 8 pages.
Walden, R. H., "Analog-to-Digital Converter Survey and Analysis," IEEE Journal on Selected Areas in Communications, vol. 17, No. 4, Apr. 1999, pp. 539-550.
Wang et al., "Beam Codebook Based Beamforming Protocol for Multi-Gbps Millimeter-Wave WPAN Systems," IEEE Journal on Selected Areas in Communications, vol. 27, No. 8, Sep. 29, 2009, pp. 1390-1399.
Wang, H., et al., "A Parametric Formulation of the UTD Diffraction Coefficient for Real-Time Propagation Prediction Modeling," IEEE Antennas and Wireless Propagation Letters, vol. 4, Aug. 15, 2005, IEEE, pp. 253-257.
Wei, Z., et al., "DoA-LF: A Location Fingerprint Positioning Algorithm With Millimeter-Wave," IEEE Access, vol. 5, Sep. 18, 2017, IEEE, pp. 22678-22688.
Witrisal, K. et al., "High-Accuracy Localization for Assisted Living: 5G systems will turn multipath channels from foe to friend," IEEE Signal Processing Magazine, vol. 33, No. 2, Mar. 2016, IEEE, pp. 59-70.
Wu et al., "Intelligent Reflecting Surface Enhanced Wireless Network via Joint Active and Passive Beamforming," IEEE Transactions on Wireless Communications, vol. 18, No. 11, Aug. 23, 2019, pp. 5394-5409.
Xia et al., "Achieving the Welch bound with difference sets," IEEE Transactions on Information Theory, vol. 51, No. 5, Apr. 25, 2005, pp. 1900-1907.
Xu, F., et al., "Revealing hidden scenes by photon-efficient occlusion-based opportunistic active imaging," Optics Express, vol. 26, No. 8, Apr. 2018, Optical Society of America, pp. 9945-9962.
Zetik, R., et al., "Looking Behind a Corner Using Multipath-Exploiting UWB Radar," IEEE Transactions on Aerospace and Electronic Systems, vol. 51, No. 3, Jul. 2015, IEEE, pp. 1916-1926.
Zhang et al., "A 4-bit Programmable Metamaterial Based on VO2Mediums," 2018 IEEE/MTT-S International Microwave Symposium—IMS, Jun. 10-15, 2018, Philadephia, PA, pp. 984-986.
Non-Final Office Action for U.S. Appl. No. 16/684,746, mailed Apr. 28, 2020, 7 pages.
Non-Final Office Action for U.S. Appl. No. 16/684,746, mailed Aug. 5, 2020, 11 pages.
Alkhateeb et al., "Channel Estimation and Hybrid Precoding for Millimeter Wave Cellular Systems," IEEE Journal of Selected Topics in Signal Processing, vol. 8, No. 5, Jul. 1, 2014, pp. 831-846.

(56) References Cited

OTHER PUBLICATIONS

Alkhateeb et al., “Deep Leaming Coordinated Beamforming for Highly-Mobile Millimeter Wave Systems,” IEEE Access, vol. 6, Jun. 25, 2018, pp. 37328-37348.
Alkhateeb et al., “Machine Learning for Reliable Mmwave Systems: Blockage Prediction and Proactive Handoff,” 2018 IEEE Global Conference on Signal and Information Processing (GlobalSIP), Nov. 26-29, 2018, Anaheim, CA, pp. 1055-1059.
Alkhateeb et al., “MIMO Precoding and Combining Solutions for Millimeter-Wave Systems,” IEEE Communications Magazine, vol. 52, No. 12, Dec. 11, 2014, pp. 122-131.
Alkhateeb, A., “DeepMIMO: A Generic Deep Leaming Dataset for Millimeter Wave and Massive MIMO Applications,” Information Theory and Applications (ITA) Workshop, Feb. 18, 2019, San Diego, CA, 8 pages.
Basar, E., “Large Intelligent Surface-Based Index Modulation: A New Beyond MIMO Paradigm for 6G,” arXiv eprint, arXiv:1904.06704v1 [cs.IT], Apr. 14, 2019, 10 pages, https://arxiv.org/pdf/1904.06704v1.pdf.
Björnson et al., “Massive MIMO is a Reality—What is Next? Five Promising Research Directions for Antenna Arrays,” arXiv eprint, arXiv: 1902.07678v1 [eess.SP], Feb. 11, 2019, 19 pages, https://arxiv.org/pdf/1902.07678v1.pdf.
Cai et al., “A Constrained 11 Minimization Approach to Sparse Precision Matrix Estimation,” Journal of American Statistical Association, vol. 106, No. 494, Theory and Methods, Jun. 2011, pp. 594-607.
Challa, S., et al., “Simultaneous Localization and Mapping in Wireless Sensor Networks,” 2005 International Conference on Intelligent Sensors, Sensor Networks and Information Processing, Dec. 2005, IEEE, pp. 81-87.
Chi, T., et al., “A Packaged 90-to-300 GHz Transmitter and 115-to-325GHz Coherent Receiver in CMOS for Full-Band Continuous-Wave mm-Wave Hyperspectral Imaging,” 2017 IEEE International Solid-Slate Circuits Conference (ISSCC), Feb. 2017, IEEE, 3 pages.
De Carvalho et al., “Non-Stationarities in Extra-Large Scale Massive MIMO,” arXiv eprint, arXiv:1903.03085v1 [cs. IT], Mar. 7, 2019, 7 pages, https://arxiv.org/abs/1903.03085v1.
Deng et al., “Deep Learning: Methods and Applications,” Foundations and Trends® in Signal Processing, vol. 7, No. 3-4, Jun. 30, 2014, pp. 197-387.
Doddalla, S. K., et al., “Non-Line of Sight Terahertz imaging from a Single Viewpoint,” 2018 IEEE/MTT-S Intemational Microwave Symposium-IMS, Jun. 2018, IEEE, pp. 1527-1529.
Dumont, T., et al., “Simultaneous localization and mapping in wireless sensor networks,” Signal Processing, vol. 101, Aug. 2014, Elsevier B.V., pp. 192-203, [Online] Available: http://www.sciencedirect.com/science/article/pii/S0165168414000814.

* cited by examiner

LARGE INTELLIGENT SURFACES WITH SPARSE CHANNEL SENSORS

RELATED APPLICATIONS

This application is a divisional of nonprovisional patent application Ser. No. 16/901,899, filed Jun. 15, 2020, pending, which claims the benefit of provisional patent application Ser. No. 62/873,551, filed Jul. 12, 2019, the disclosures of which are hereby incorporated herein by reference in their entireties.

FIELD OF THE DISCLOSURE

The present disclosure relates to large intelligent surfaces (LISs) for wireless communications, such as radio frequency (RF) communications.

BACKGROUND

Large intelligent surfaces (LISs) are envisioned as intrinsic components of beyond-fifth generation (5G) wireless systems. In its core design concept, an LIS realizes a continuous electromagnetically active surface by stacking a massive number of radiating/sensing elements. These elements interact with incident signals, for example by reflecting them, in a way that improves the coverage and rate of the wireless systems. This concept is further motivated by the potential energy-efficient implementations using nearly passive elements, such as analog phase shifters. Prior work has focused on developing efficient designs for LIS reflection matrices and evaluating their coverage and rate gains assuming the existence of global channel knowledge. But how these extremely large-dimensional channels are to be estimated if the LIS is implemented using only reflecting elements remains a question. Obtaining this channel knowledge may require huge—and possibly prohibitive—training overhead, which presents a major challenge for the operation of LIS systems.

LIS-assisted wireless communication is attracting increased interest. In terms of the circuit implementations, LIS surfaces can be realized using nearly passive elements with reconfigurable parameters. Candidate designs include conventional reflect-arrays and software-defined metamaterials, among others. Using these surfaces, several signal processing solutions have been proposed to optimize the design of the LIS reconfigurable parameters (mostly considering the LIS as a reflecting surface). One approach considered an LIS-assisted downlink multi-user setup with single-antenna users. The LIS elements were modeled as quantized phase shifters/reflectors and computational low-complexity algorithms were developed to design these LIS phase matrices. Another approach considered an LIS-assisted downlink scenario, and the precoder matrix at the base station as well as the LIS reflection matrices were designed, focusing on the case where a line-of-sight (LOS) exists between the base station and the LIS. Another approach considered a new transmission strategy combining LIS with index modulation to improve the system spectral efficiency. In terms of the overall system performance, another approach considered an uplink multi-user scenario and characterized the data rates with channel estimation errors.

Each of the above approaches assumed that the knowledge about the channels between the LIS and the transmitters/receivers would be available at a base station, either perfectly or with some error. Obtaining this channel knowledge, however, is one of the most critical challenges for LIS systems due to the massive number of antennas (LIS elements) and the hardware constraints on these elements.

More specifically, if the LIS elements are implemented using phase shifters that just reflect the incident signals, then there are two main approaches for designing the LIS reflection matrix. The first approach is to estimate the LIS-assisted channels at the transmitter/receiver by training all the LIS elements, normally one by one, and then use the estimated channels to design the reflection matrix. This yields massive channel training overhead due to the very large number of elements at the LIS. Instead of the explicit channel estimation, the LIS reflection matrix can be selected from quantized codebooks via online beam/reflection training. This is similar to the common beam training techniques in millimeter wave (mmWave) systems that employ similar phase shifter architectures. To sufficiently quantize the space, however, the size of the reflection codebooks needs normally to be in the order of the number of antennas, which leads to huge training overhead. To avoid this training overhead, a trivial solution is to employ fully digital or hybrid analog/digital architectures at the LIS, where every antenna element is connected somehow to the baseband where channel estimation strategies can be used to obtain the channels. This solution, however, leads to high hardware complexity and power consumption given the massive number of LIS elements.

SUMMARY

Large intelligent surfaces (LISs) with sparse channel sensors are provided. Employing LISs is a promising solution for improving the coverage and rate of future wireless systems. These surfaces comprise massive numbers of nearly passive elements that interact with the incident signals (e.g., by reflecting them) in a smart way that improves the wireless system performance. Previously proposed solutions focused on design of LIS reflection matrices assuming full channel knowledge. Estimating these channels at the LIS, however, is a key challenging problem. With the massive number of elements in an LIS, channel estimation or reflection beam training will be associated with (i) huge training overhead if all the LIS elements are passive (not connected to a baseband) or with (ii) prohibitive hardware complexity and power consumption if all the elements are connected to the baseband through a fully digital or hybrid analog/digital architecture. Embodiments described herein provide efficient solutions for these problems by leveraging tools from compressive sensing and deep learning (e.g., artificial intelligence).

In this regard, an LIS architecture based on sparse channel sensors is provided. In this architecture, all the LIS elements are passive reconfigurable elements except for a few elements that are active (e.g., connected to baseband). Two solutions are developed that design the LIS reflection matrices with negligible training overhead. In the first approach, compressive sensing tools are leveraged to construct the channels at all the LIS elements from the channels seen only at the active elements. These full channels can then be used to design the LIS reflection matrices with no training overhead. In the second approach, a deep learning-based solution is deployed where the LIS learns how to optimally interact with the incident signal given the channels at the active elements, which represent the current state of the environment and transmitter/receiver locations.

The achievable rates of the proposed compressive sensing and deep learning (artificial intelligence) solutions approach the upper bound (which assumes perfect channel knowledge) with negligible training overhead and with less than 1% of the LIS elements being active. Thus, the proposed LIS architecture provides an energy efficient and spectral efficient solution to channel estimation.

An exemplary embodiment provides an LIS, comprising: an array of passive reconfigurable reflecting elements; a plurality of active channel sensing elements; and an LIS controller coupled to the plurality of active channel sensing elements and configured to resolve a reflection matrix to facilitate wireless communication over a wireless channel.

Another exemplary embodiment provides a method for operating an LIS, the method comprising: operating a plurality of active channel sensing elements among a larger array of passive reconfigurable reflecting elements in a channel sensing mode; and adjusting the plurality of passive reconfigurable reflecting elements based on output of the channel sensing mode.

Another exemplary embodiment provides a wireless communications system, comprising: an LIS, comprising: an array of passive reconfigurable reflecting elements; and a plurality of active channel sensing elements, fewer in number than the array of passive reconfigurable reflecting elements. The wireless communications system further comprises an LIS controller operable to estimate a wireless channel using the plurality of active channel sensing elements.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

DETAILED DESCRIPTION

Figure 1:
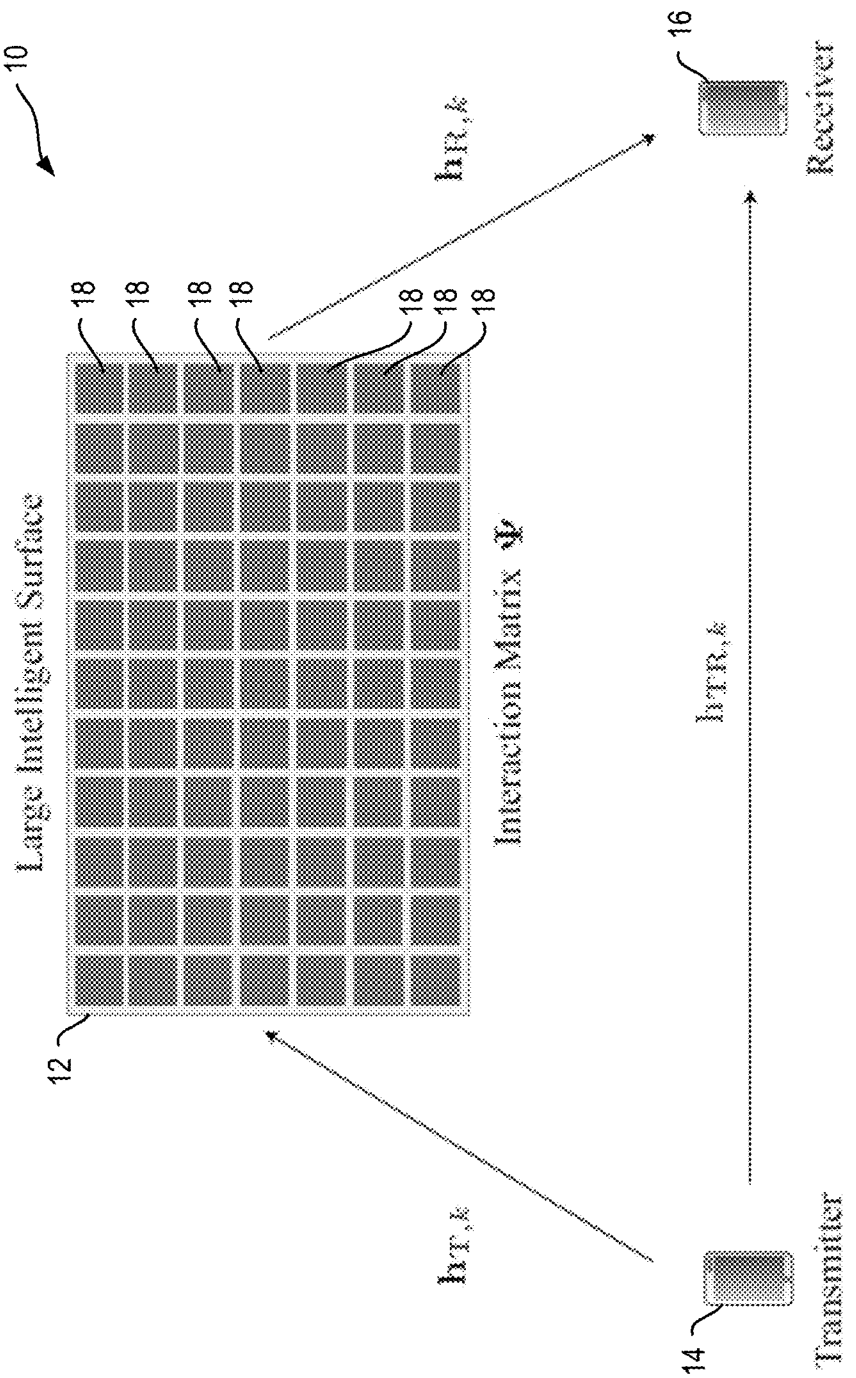
FIG. 1 is a system model of a wireless communications system which includes a large intelligent surface (LIS).

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Large intelligent surfaces (LISs) with sparse channel sensors are provided. Employing LISs is a promising solution for improving the coverage and rate of future wireless systems. These surfaces comprise massive numbers of nearly passive elements that interact with the incident signals (e.g., by reflecting them) in a smart way that improves the wireless system performance. Previously proposed solutions focused on design of LIS reflection matrices assuming full channel knowledge. Estimating these channels at the LIS, however, is a key challenging problem. With the massive number of elements in an LIS, channel estimation or reflection beam training will be associated with (i) huge training overhead if all the LIS elements are passive (not connected to a baseband) or with (ii) prohibitive hardware complexity and power consumption if all the elements are connected to the baseband through a fully digital or hybrid analog/digital architecture. Embodiments described herein provide efficient solutions for these problems by leveraging tools from compressive sensing and deep learning (e.g., artificial intelligence).

In this regard, an LIS architecture based on sparse channel sensors is provided. In this architecture, all the LIS elements are passive reconfigurable elements except for a few elements that are active (e.g., connected to baseband). Two solutions are developed that design the LIS reflection matrices with negligible training overhead. In the first approach, compressive sensing tools are leveraged to construct the channels at all the LIS elements from the channels seen only at the active elements. These full channels can then be used to design the LIS reflection matrices with no training overhead. In the second approach, a deep learning-based solution is deployed where the LIS learns how to optimally interact with the incident signal given the channels at the active elements, which represent the current state of the environment and transmitter/receiver locations.

The achievable rates of the proposed compressive sensing and deep learning (e.g., artificial intelligence) solutions approach the upper bound (which assumes perfect channel knowledge) with negligible training overhead and with less than 1% of the LIS elements being active. Thus, the proposed LIS architecture provides an energy efficient and spectral efficient solution to channel estimation.

I. Notation

The following notation is used throughout this disclosure: A is a matrix, a is a vector, a is a scalar, $\mathcal{A}$ is a set of scalars, and $\boldsymbol{\mathcal{A}}$ is a set of vectors. $\|a\|_p$ is the p-norm of a. |A| is the determinant of A, whereas $A^T$, $A^H$, A*, $A^{-1}$, $A^\dagger$ are its transpose, Hermitian (conjugate transpose), conjugate, inverse, and pseudo-inverse respectively. $[A]_{r,:}$ and $[A]_{:,c}$ are the rth row and cth column of the matrix A, respectively. diag(a) is a diagonal matrix with the entries of a on its diagonal. I is the identity matrix. $1_N$ and $0_N$ are the N-dimensional all-ones and all-zeros vector respectively. A⊙B and A⊗B are the Hadamard product and Kronecker products of A and B, respectively. $\mathcal{N}$(m, R) is a complex Gaussian random vector with mean m and covariance R. $\mathbb{E}$ [.] is used to denote expectation. vec(A) is a vector whose elements are the stacked columns of matrix A.

II. System and Channel Models

This section describes system and channel models adopted herein for characterizing LISs.

A. System Model

FIG. 1 is a system model of a wireless communications system 10 which includes an LIS 12. In this regard, the wireless communications system 10 includes a transmitter 14 in communication with a receiver 16, and this communication is assisted by the LIS 12. For illustrative purposes, the wireless communications system 10 is illustrated with the LIS 12 having M antennas while both the transmitter 14 and receiver 16 are single-antenna. It should be understood, however, that aspects disclosed herein can be extended to multi-antenna transceivers. It should further be understood that these transmitters 14 and receivers 16 can represent various wireless communications devices, such as base stations and user equipment.

Adopting an orthogonal frequency-division multiplexing (OFDM)-based system of K subcarriers, and defining $h_{T,k}$, $h_{R,k} \in \mathbb{C}^{M\times 1}$ as the M×1 uplink channels from the transmitter 14 and receiver 16 to the LIS 12 at the kth subcarrier, $$h_{T,k}^T,\ h_{R,k}^T$$

as the downlink channels by reciprocity, $h_{TR,k} \in \mathbb{C}$ as the direct channel between the transmitter 14 and receiver 16, then the received signal at the receiver 16 can be written as:

$$y_k = \underbrace{h_{R,k}^T \Psi_k h_{T,k} s_k}_{LIS-assisted\ link} + \underbrace{h_{TR,k} s_k}_{Direct\ link} + n_k \qquad \text{(Eqn. 1)}$$

where $s_k$ denotes the transmitted signal over the kth subcarrier and satisfies $$\mathbb{E}[|s_k|^2] = \frac{P_T}{K}, \quad \text{(Eqn. 1)}$$

with $P_T$ representing the total transmit power, and $$n_k \sim \mathcal{N}_{\mathbb{C}}(0, \sigma_n^2)$$

is the receive noise. The M×M matrix $\Psi_k$, referred to as the LIS interaction matrix, represents the interaction of the LIS 12 with the incident (e.g., impinging) signal from the transmitter 14. The overall objective of the LIS 12 is then to interact with the incident signal (via adjusting $\Psi_k$) in a way that optimizes a certain performance metric, such as the system achievable rate or the network coverage.

For illustrative purposes, the present disclosure focuses on the case where the direct link does not exist. This represents the scenarios where the direct link is either blocked or has negligible receive power compared with that received through the LIS-assisted link. With this assumption, the receive signal can be expressed as:

$$y_k = h_{R,k}^T \Psi_k h_{T,k} s_k + n_k \quad \text{(Eqn. 2)}$$

$$\overset{(a)}{=} (h_{R,k} \odot h_{T,k})^T \psi_k s_k + n_k \quad \text{(Eqn. 3)}$$

where (a) follows from noting that the interaction matrix $\Psi_k$ has a diagonal structure, and denoting the diagonal vector as $\psi_k$, i.e., $\Psi_k = \text{diag}(\psi_k)$. This diagonal structure results from the operation of the LIS 12 where every element m, m=1, 2, . . . , M reflects the incident signal after multiplying it with an interaction factor $[\psi_k]_m$.

Two important notes are made on these interaction vectors. First, while the interaction factors, $[\psi_k]_m$, ∀m, k, can generally have different magnitudes (amplifying/attenuation gains), it is more practical to assume that LIS elements 18 are implemented using only phase shifters. Second, since the implementation of the phase shifters is done in the analog domain (using radio frequency (RF) circuits), the same phase shift is applied to the signals on all subcarriers, i.e., $\psi_k = \psi$, ∀k. Accounting for these practical considerations, it is assumed that every interaction factor is just a phase shifter, i.e., $[\psi]_m = e^{j\phi m}$. Further, the interaction vector ψ in this case is referred to as the reflection beamforming vector.

B. Channel Model

With continuing reference to FIG. 1, a wideband geometric channel model is adopted for the channels $h_{T,k}$, $h_{R,k}$ between the transmitter 14 and receiver 16 and the LIS 12. Consider a transmitter-LIS uplink channel $h_{T,k}$ (and similarly for $h_{R,k}$) consisting of L clusters, and each cluster $\ell$ is contributing with one ray of time delay $\tau_\ell \in \mathbb{R}$, a complex coefficient $\alpha_\ell \in \mathbb{C}$, and azimuth/elevation angles of arrival, $\theta_\ell$, $\phi_\ell \in [0, 2\pi]$. Let $\rho_T$ denote the path loss between the transmitter 14 and the LIS 12 and $p(\tau)$ characterizes the pulse shaping function for $T_s$-spaced signaling evaluated at τ seconds. The delay-d channel vector, $h_{rd} \in \mathbb{C}^{M\times 1}$, between the transmitter 14 and the LIS 12 can then be defined as:

$$h_{T,d} = \sqrt{\frac{M}{\rho_T}} \sum_{\ell=1}^{L} \alpha_\ell p(dT_s - \tau_\ell) a(\theta_\ell \phi_\ell) \quad \text{(Eqn. 4)}$$

where $a(\theta_\ell \ \phi_\ell) \in \mathbb{C}^{M\times 1}$ denotes the array response vector of the LIS 12 at the angles of arrival $\theta_\ell$ $\phi_\ell$. Given this delay-d channel, the frequency domain channel vector at subcarrier k, $h_{T,k}$ can be written as:

$$h_{T,k} = \sum_{d=0}^{D-1} h_{T,d} e^{-j\frac{2\pi k}{K}d} \quad \text{(Eqn. 5)}$$

Considering a block-fading channel model, $h_{T,k}$ and $h_{R,k}$ are assumed to stay constant over the channel coherence time, denoted $T_C$, which depends on the user mobility and the dynamics of the environment among others. It is worth noting that the number of channel paths L depends highly on the operational frequency band and the propagation environment. For example, millimeter wave (mmWave) channels normally consist of a small number of channel paths, ~3-5 paths, while sub-6 gigahertz (GHz) signal propagation generally experiences rich scattering resulting in channels with more multi-path components.

III. Problem Formulation

In an exemplary aspect, the LIS interaction vector (reflection beamforming vector), ψ, is designed to maximize the achievable rate at the receiver 16. Given the system and channel models described above, this achievable rate can be written as $$R = \frac{1}{K}\sum_{k=1}^{K} \log_2\left(1 + SNR\left|h_{R,k}^T \Psi h_{T,k}\right|^2\right) \quad \text{(Eqn. 6)}$$

$$= \frac{1}{K}\sum_{k=1}^{K} \log_2\left(1 + SNR\left|(h_{T,k} \odot h_{R,k})^T \psi\right|^2\right) \quad \text{(Eqn. 7)}$$

where $$SNR = \frac{P_T}{K\sigma_n^2}$$

denotes the signal-to-noise ratio. As mentioned above, every element in the LIS reflection beamforming vector, ψ, is implemented with signal processing circuitry, including an RF phase shifter. In some examples, the signal processing circuitry can include additional components, such as filters, amplifiers, and so on.

These phase shifters, however, normally have a quantized set of angles and cannot shift the signal with any phase. To capture this constraint, it is assumed that the reflection beamforming vector ψ can only be picked from a predefined codebook $\mathcal{P}$. Every candidate reflection beamforming code word in $\mathcal{P}$ is assumed to be implemented using quantized phase shifters. With this assumption, the objective is then to find the optimal reflection beamforming vector ψ* that solves $$\psi^* = \underset{\psi \in \mathcal{P}}{\arg\max} \sum_{k=1}^{K} \log_2\left(1 + SNR\left|(h_{T,k} \odot h_{R,k})^T \psi\right|^2\right) \quad \text{(Eqn. 8)}$$

to result in the optimal rate R* defined as $$R^* = \max_{\psi\in\mathcal{P}} \frac{1}{K}\sum_{k=1}^{K} \log_2\left(1 + SNR\left|(h_{T,k} \odot h_{R,k})^T\psi\right|^2\right) \quad \text{(Eqn. 9)}$$

Due to the quantized codebook constraint and the time-domain implementation of the reflection beamforming vector, i.e., using one interaction vector ψ for all subcarriers, there is no closed form solution for the optimization problem in Eqn. 8. Consequently, finding the optimal reflection beamforming vector for the LIS ψ* requires an exhaustive search over the codebook $\mathcal{P}$.

The main challenge: As characterized in Eqn. 8, finding the optimal LIS interaction vector ψ* and achieving the optimal rate R* requires an exhaustive search over the codebook $\mathcal{P}$. Note that the codebook size should normally be in the same order of the number of antennas to make use of these antennas. This means that a reasonable reflection beamforming codebook for LIS systems will probably have thousands of candidate code words. With such huge codebooks, solving the exhaustive search in Eqn. 8 is very challenging. More specifically, there are two main approaches for performing the search in Eqn. 8:

- Full channel estimation with offline exhaustive search: In this approach, the full channels between the LIS 12 and the transmitter 14 and receiver 16, $h_{T,k}$, $h_{R,k}$ must be estimated and used to find the optimal reflection beamforming vector by the offline calculation of Eqn. 8. Estimating these channel vectors, however, requires the LIS 12 to employ a complex hardware architecture that connects all the LIS elements 18 (e.g., antenna elements) to a baseband processing unit either through a fully digital or hybrid analog/digital architecture. Given the massive numbers of LIS elements 18 (e.g., antennas), this approach can yield prohibitive hardware complexity in terms of routing and power consumption, among other issues. If the LIS 12 is operated and controlled via a base station/access point, then this channel estimation process can be done at these communication ends. This, however, assumes an orthogonal training over the LIS elements 18 (e.g., by activating one LIS antenna at a time), which leads to prohibitive training overhead given the number of LIS elements 18 at the LIS 12.
- Online exhaustive beam training: Instead of the explicit channel estimation, the best LIS beam reflection vector ψ* can be found through an over-the-air beam training process. This process essentially solves the exhaustive search in Eqn. 8 by testing the candidate interaction vectors ψ∈ $\mathcal{P}$ one by one. This exhaustive beam training process, however, incurs again very large training overhead at the LIS 12.

Exemplary embodiments disclosed herein address this main challenge to facilitate deployment of LISs 12 in wireless communications systems 10. More specifically, the objective is to enable LIS systems to approach the optimal achievable rate in Eqn. 9 while adopting low-complexity hardware architectures and requiring low training overhead. For this objective, a novel energy-efficient LIS transceiver architecture is proposed below in Section IV (with reference to FIG. 2). Using this LIS architecture, near-optimal achievable rates can be obtained with negligible training overhead via leveraging tools from compressive sensing and deep learning (e.g., artificial intelligence), as described below in Sections V and VI (with reference to FIGS. 3-5). Simulation results of these approaches are further described below in Section VII (with reference to FIGS. 6-16). A computer system which may be used in conjunction with the LIS architecture is described below in Section VIII (with reference to FIG. 17).

IV. Large Intelligent Surfaces with Sparse Sensors: Architecture

Figure 2:
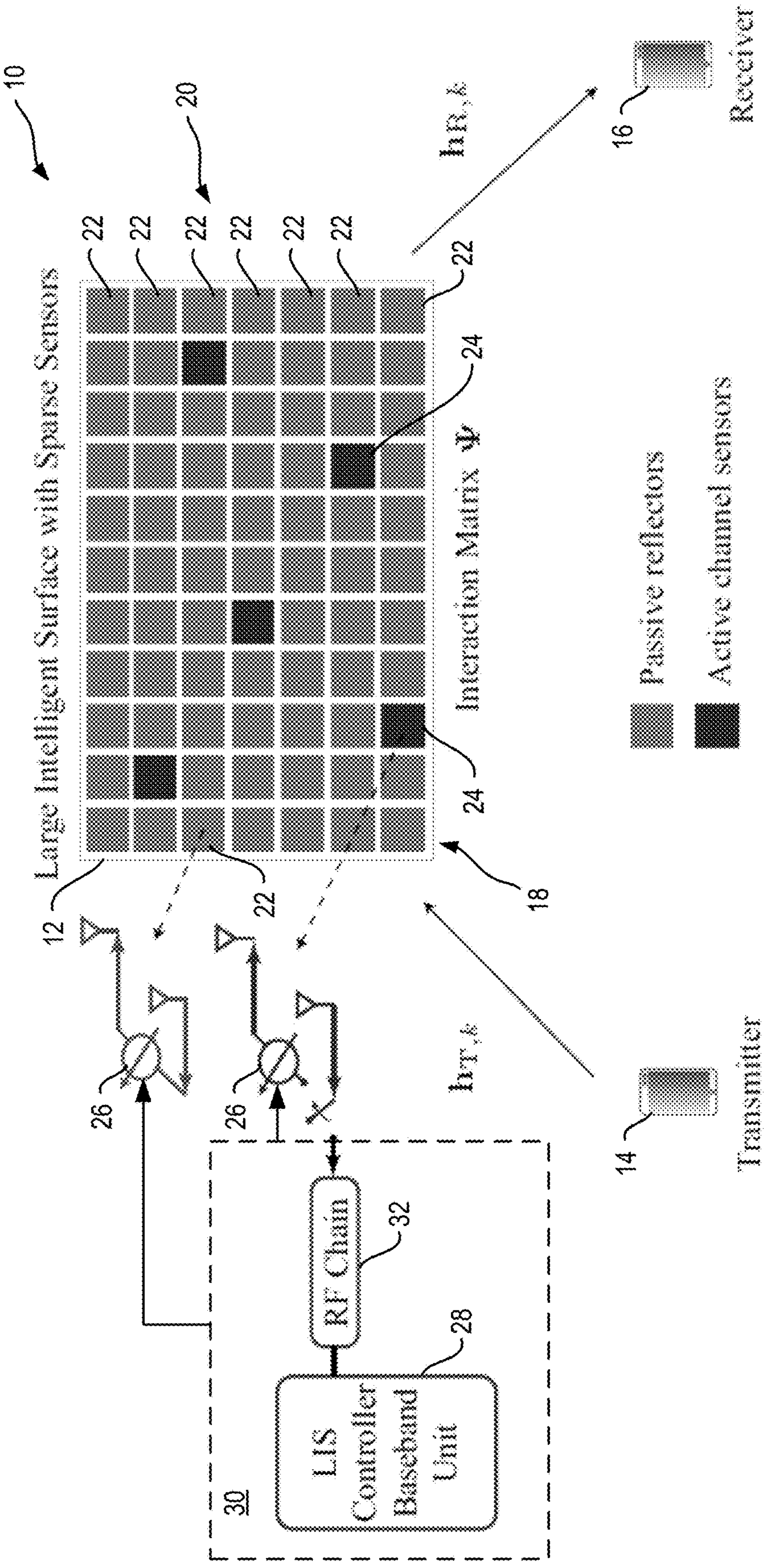
FIG. 2 is a schematic diagram of an exemplary LIS architecture with sparse sensors.

FIG. 2 is a schematic diagram of an exemplary LIS architecture 20 with sparse sensors. As discussed in Section III above, a main challenge for LIS system operation lies in the high hardware complexity and training overhead associated with designing the LIS interaction (reflection beamforming) vector, ψ. In order to overcome this challenge and enable LIS systems in practice, the LIS architecture 20 of FIG. 2 includes (i) M passive reconfigurable reflecting elements 22, and (ii) a small number, $\overline{M}$<<M, of active channel sensing elements 24 distributed over the LIS 12. In an exemplary aspect, each passive reconfigurable reflecting element 22 is implemented using an RF phase shifter 26 (and may include additional circuitry, such as one or more filters, amplifiers, and so on) and is not connected to a baseband unit 28 in an LIS controller 30.

For illustrative purposes, it is assumed that the $\overline{M}$ active channel sensing elements 24 are selected from the M elements 22 in the LIS 12. In addition, the active channel sensing elements 24 have two modes of operation (as shown in FIG. 2): (i) a channel sensing mode where the active channel sensing elements 24 work as receivers with full RF chains 32 and baseband processing (e.g., through the baseband unit 28), and (ii) a reflection mode where the active channel sensing elements 24 act just as the rest of the passive reconfigurable reflecting elements 22 that reflect the incident signal. In some embodiments, the dual mode operation is achieved by selectively coupling (e.g., with an array of switches) each of the active channel sensing elements 24 to the RF chain 32 and the baseband unit 28.

It is important to note that while the M phase shifting elements are described as passive reconfigurable reflecting elements 22 to differentiate them from the $\overline{M}$ active channel sensing elements 24, they can be implemented using reconfigurable active RF circuits. In addition, in some embodiments the active channel sensing elements 24 operate only in the channel sensing mode.

Using outputs from the channel sensing mode, the LIS controller 30 (which can include the baseband unit 28, the RF chain 32, and other processing logic) is configured to adjust the passive reconfigurable reflecting elements 22 (and operation of the active channel sensing elements 24 in the reflection mode). In an exemplary aspect, the LIS controller 30 is connected to each of the passive reconfigurable reflecting elements 22 and the active channel sensing elements 24, and adjusts the corresponding RF phase shifters 26 in accordance with one or more channel estimates from the active channel sensing elements 24.

Next, the channels are defined from the transmitter 14 and receiver 16 to the active channel sensing elements 24 of the LIS 12. Then the manner to leverage this energy-efficient LIS architecture 20 for designing the LIS interaction vector ψ (e.g., reflection beamforming vector) is described.

Sampled channel vectors: The $\overline{M}$×1 uplink sampled channel vector, $\bar{h}_{T,k}\in \mathbb{C}^{\overline{M}\times 1}$ is defined as the channel vector from the transmitter 14 to the $\overline{M}$ active channel sensing elements 24 at the LIS 12. This vector can then be expressed as:

$$\bar{h}_{T,k} = G_{LIS} h_{T,k} \quad \text{(Eqn. 10)}$$

where $G_{LIS}$ is an $\bar{M}\times M$ selection matrix that selects the entries of the original channel vector, $h_{T,k}$, that correspond to the active channel sensing elements 24. If $\mathcal{A}$ defines the set of indices of the active channel sensing elements 24 (e.g., active LIS antenna elements), $|\mathcal{A}|=\bar{M}$, then $G_{LIS}=\mathbf{I}_{\mathcal{A},:}$, i.e., $G_{LIS}$ includes the rows of the M×M identity matrix, I, that correspond to the indices of the active channel sensing elements 24. The sampled channel vector, $\bar{h}_{R,k}\in \mathbb{C}^{\bar{M}\times 1}$, from the receiver 16 to the $\bar{M}$ active channel sensing elements 24 of the LIS 12 is similarly defined. Finally, $\bar{h}_k=\bar{h}_{T,k}\odot\bar{h}_{R,k}$ is defined as the overall LIS sampled channel vector at the kth subcarrier.

Designing the LIS interaction vector: For the wireless communications system 10 in Section II-A (FIG. 1) with the proposed LIS architecture 20 of FIG. 2, estimating the sampled channel vectors $\bar{h}_{T,k}$, $\bar{h}_{R,k}$ can be readily done with a few pilot signals. For example, adopting an uplink training approach, the transmitter 14 can send one pilot signal that will be simultaneously received and processed by all the active channel sensing elements 24 in the LIS 12 to estimate $\bar{h}_{T,k}$ (and similarly for $\bar{h}_{R,k}$). Given these sampled channel vectors, the LIS 12 can find the optimal reflection beamforming vector $\psi^*$ that solves Eqn. 9. Two approaches are proposed below for solving Eqn. 9 leveraging tools from compressive sensing and deep learning (e.g., artificial intelligence).

V. Compressive Sensing-Based LIS Interaction Design

As described in Section III, finding the optimal LIS interaction (reflection beamforming) vector $\psi^*$ that maximizes the achievable rate with no beam training overhead requires the availability of the full channel vectors $h_{T,k}$, $h_{R,k}$. Estimating these channel vectors at the LIS 12, however, normally requires that every LIS antenna (e.g., LIS element 18) gets connected to the baseband unit 28 through a fully digital or hybrid architecture. This can massively increase the hardware complexity with the large number of antennas at the LIS systems. In some embodiments, by adopting the low-complexity LIS architecture proposed in Section IV (FIG. 2), it is possible to recover the full channel vectors $h_{T,k}$, $h_{R,k}$ from the sampled channel vectors $\bar{h}_{T,k}$, $\bar{h}_{R,k}$ when the channels experience sparse scattering. This is typically the case in mmWave and line-of-sight (LOS)-dominant sub-6 GHz systems.

A. Recovering Full Channels from Sampled Channels

With the proposed LIS architecture 20 in FIG. 2, the LIS 12 can readily estimate the sampled channel vectors $\bar{h}_{T,k}$, $\bar{h}_{R,k}$ through uplink training from the transmitter 14 and receiver 16 to the LIS 12 with a few pilots. Next, an approach to use these sampled channel vectors to estimate the full channel vectors $h_{T,k}$, $h_{R,k}$ is explained. First, note that the $h_{T,k}$ in Eqn. 4 and Eqn. 5 (and similarly for $h_{R,k}$) can be written as:

$$h_{T,k} = \sqrt{\frac{M}{\rho_T}} \sum_{d=0}^{D-1} \sum_{\ell=1}^{L} \alpha_\ell p(dT_s - \tau_\ell) a(\theta_\ell \phi_\ell) e^{-j\frac{2\pi k}{K}d} \quad \text{(Eqn. 11)}$$

$$= \sum_{\ell=1}^{L} \beta_{\ell,k} a(\theta_\ell \phi_\ell) \quad \text{(Eqn. 12)}$$

-continued $$\text{where } \beta_{\ell,k} = \sqrt{\frac{M}{\rho_T}} \alpha_\ell \sum_{d=0}^{D-1} p(dT_s - \tau_\ell) e^{-j\frac{2\pi k}{K}d}.$$

Further, by defining the array response matrix A and the kth subcarrier path gain vector $\beta_k$ as:

$$A = [a(\theta_1\phi_1), a(\theta_2\phi_2) \ldots , a(\theta_\ell\phi_\ell)] \quad \text{(Eqn. 13)}$$

$$\beta_k = [\beta_{1,k}, \beta_{2,k} \ldots , \beta_{L,k}]^T \quad \text{(Eqn. 14)}$$

where $h_{T,k}$ can be written in a more compact way as $h_{T,k}=A\beta_k$. In several important scenarios, such as mmWave and LOS-dominant sub-6 GHz, the channel experiences sparse scattering, which results in a small number of paths L. In order to leverage this sparsity, a dictionary of array response vectors $A_D$ is defined, where every column constructs an array response vector in one quantized azimuth and elevation direction.

For example, if the LIS 12 adopts a uniform planar array (UPA) structure, then $A_D$ can be defined as:

$$A_D = A_D^{Az} \otimes A_D^{El} \quad \text{(Eqn. 15)}$$

with $$A_D^{Az}$$

and $$A_D^{El}$$

being the dictionaries of the azimuth and elevation array response vectors. Every column in $$A_D^{Az}$$

(and similarly for $$A_D^{El})$$

constructs an azimuth array response in one quantized azimuth (elevation) direction. If the number of grid points in the azimuth and elevation dictionaries are $$N_D^{Az}$$

and $$N_D^{El},$$

respectively, and the number of horizontal and vertical elements of the UPA are $M_H$, $M_V$, where $M=M_HM_V$, then $A_D$ has dimensions $$M \times N_D^{Az} N_D^{El}.$$

Now, assuming that size of the grid is large enough such that the azimuth and elevation angles $\theta_\ell$, $\phi_\ell$, $\forall \ell$ matches exactly L points in this grid (which is a common assumption in the formulations of the sparse channels estimation approaches), then $h_{T,k}$ can be rewritten as:

$$h_{T,k} = A_D x_{\beta,k} \quad \text{(Eqn. 16)}$$

where $x_{\beta,k}$ is an $$N_D^{Az} N_D^{El}$$

sparse vector with $$L \ll N_D^{Az} N_D^{El}$$

non-zero entries equal to the elements of $\beta_k$. Further, these non-zero entries are in the positions that correspond to the channel azimuth/elevation angles of arrival.

Next, let $\hat{h}_{T,k}$ denote the noisy sampled channel vectors, then $\hat{h}_{T,k}$ can be written:

$$\hat{h}_{T,k} = G_{LIS} h_{T,k} + v_k \quad \text{(Eqn. 17)}$$

$$= G_{LIS} A_D x_{\beta,k} + v_k \quad \text{(Eqn. 18)}$$

$$= \Phi x_\beta + v_k \quad \text{(Eqn. 19)}$$

where $$v_k \sim \mathcal{N}_{\mathbb{C}}(0, \sigma_n^2 \mathrm{I})$$

represent the receive noise vector at the active channel sensing elements 24 and $G_{LIS}$ is the selection matrix defined in Eqn. 10. Now, given the equivalent sensing matrix, $\Phi$ and the noisy sampled channel vector $\hat{h}_{T,k}$, the objective is to estimate the sparse vector $x_\beta$ that solves the non-convex combinatorial problem:

$$\min \|x_{\beta,k}\|_0 \ \text{ s.t.} \left\| \hat{h}_{T,k} - \Phi x_{\beta,k} \right\|_2 \le \sigma \quad \text{(Eqn. 20)}$$

Given the sparse formulation in Eqn. 20, several compressive sensing reconstruction algorithms, such as orthogonal matching pursuit (OMP), can be employed to obtain an approximate solution for $x_{\beta,k}$. With this solution for $x_{\beta,k}$, the full channel vector $h_{T,k}$ can be constructed according to Eqn. 16. Finally, the constructed full channel vector can be used to find the LIS reflection beamforming vector $\psi_n^{cs} \in \mathcal{P}$, out of the codebook $\mathcal{P}$, via an offline search using Eqn. 8.

Embodiments are described herein with an assumption that the $\overline{M}$ active channel sensing elements 24 are randomly selected from the M LIS elements 18, wherein all the LIS elements 18 are equally likely to be selected. However, specific selection of the active channel sensing elements 24 designs the compressive sensing matrix $\Phi$ and decides its properties. Therefore, some examples optimize selection of the active channel sensing elements 24, leveraging tools from nested arrays, co-prime arrays, incoherence frames, and/or difference sets.

B. Simulation Results and Discussion

To evaluate the performance of the proposed compressive sensing-based solution, a simulation setup at two different carrier frequencies (e.g., 3.5 GHz and 28 GHz) is considered. The simulation setup consists of one LIS 12 with a UPA in the y-z plane, which reflects the signal coming from one transmitter 14 to another receiver 16. This UPA consists of 16×16 antennas at 3.5 GHz and 64×64 antennas at 28 GHz. The channels are generated using the publicly available ray-tracing-based DeepMIMO dataset (A. Alkhateeb, "DeepMIMO: A Generic Deep Learning Dataset for Millimeter Wave and Massive MIMO Applications," in Proc. of Information Theory and Applications Workshop (ITA), San Diego, CA, February 2019, pp. 1-8. Available: https://www.deepmimo.net/), with the 'O1' scenario that consists of a street and buildings on the sides of the street. A detailed description of the simulation setup is described below in Section VII-A.

Given this described setup, and using the LIS architecture 20 in FIG. 2, the compressive sensing-based solution described in Section V-A is applied as follows: (i) The channel vectors $h_{T,k}$, $h_{R,k}$ are obtained using the ray-tracing-based DeepMIMO dataset, and noise is added with the noise parameters described in Section VII-A. (ii) Adopting the LIS architecture 20 in FIG. 2, M LIS elements 18 are randomly selected to be active channel sensing elements 24, and the sampled channel vectors $\hat{h}_{T,k}$, $\hat{h}_{R,k}$ are constructed. (iii) Using OMP with a grid of size $$N_D^{Az} N_D^{El},\ N_D^{Az} = 2M_H,\ N_D^{El} = 2M_V,$$

an approximate solution of the full channel vectors is recovered and used to search for the optimal LIS interaction vector using Eqn. 8.

Figure 3:
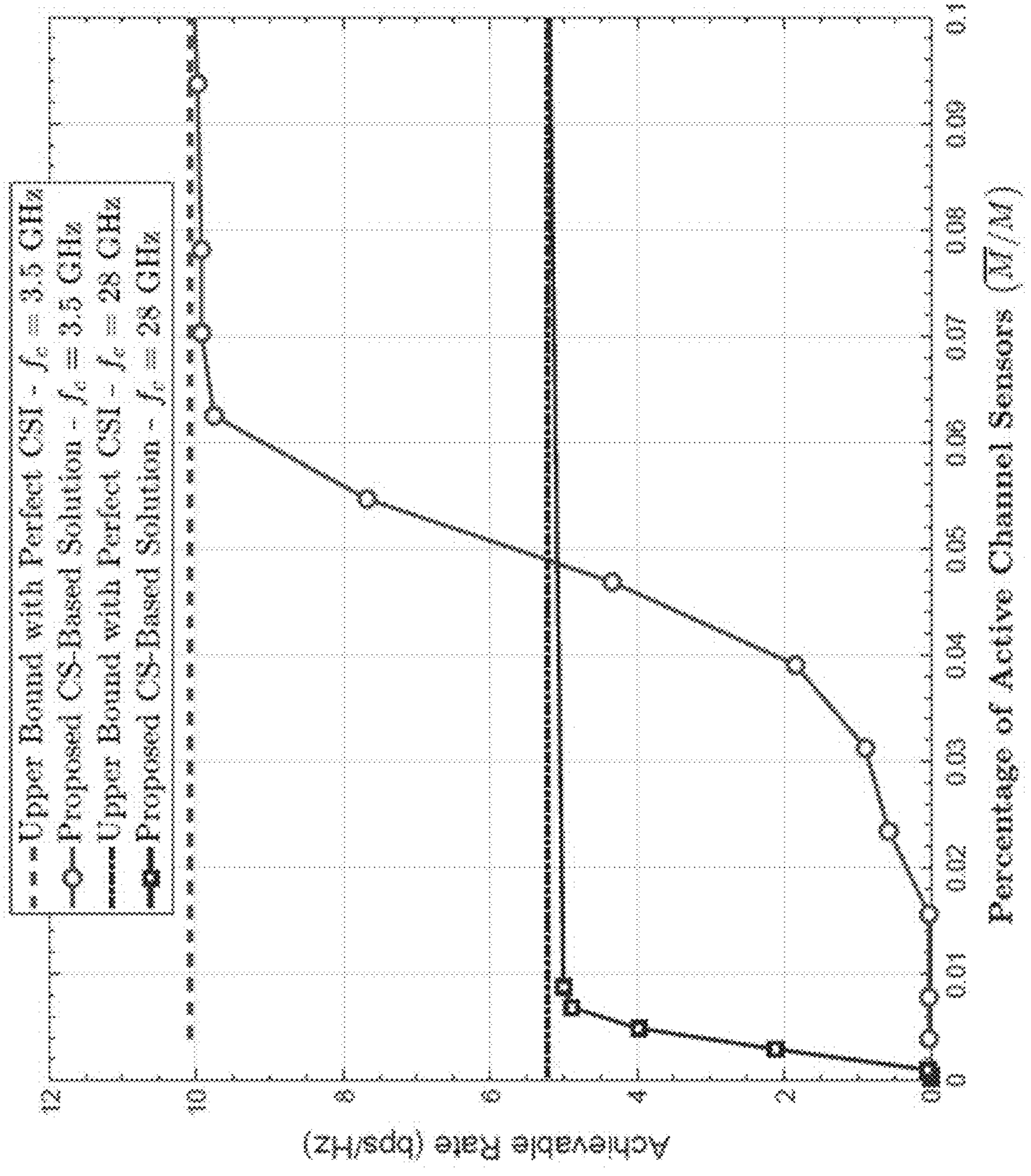
FIG. 3 is a graphical representation of achievable rates using a proposed compressive sensing-based solution for two scenarios, millimeter waver (mmWave) 28 gigahertz (GHz) and low-frequency 3.5 GHz.

Gains and Limitations: FIG. 3 is a graphical representation of achievable rates using the proposed compressive sensing-based solution for two scenarios, mmWave 28 GHz and low-frequency 3.5 GHz. The achievable rate is plotted using this proposed compressive sensing-based solution and compared with the upper bound with perfect full channel knowledge, calculated according to Eqn. 9. In this regard, FIG. 3 illustrates the achievable rates of the proposed compressive sensing-based solution versus the ratio of the active channel sensing elements 24 to the total number of LIS elements 18 (e.g., antennas), i.e., $\overline{M}/M$. The proposed novel LIS architecture 20 with the compressive sensing-based solution can achieve almost the optimal rate with a small fraction of the LIS antennas being active. This illustrates the significant saving in power consumption that can be achieved using the LIS architecture 20 in FIG. 2 that includes a few active channel sensors. Further, since the LIS reflection beamforming vector $\psi$ is obtained through an offline search with no beam training, the proposed solution approaches the optimal rate with negligible training overhead, ideally two uplink pilots to estimate $\hat{\bar{\mathbf{h}}}_{T,k}$, $\hat{\bar{\mathbf{h}}}_{R,k}$. This enables the proposed LIS architecture 20 to support highly mobile applications, such as vehicular communications and wireless virtual/augmented reality.

Despite this interesting gain of the proposed compressive sensing-based solution, it has a number of limitations. First, recovering the full channel vectors from the sampled ones according to Section V-A requires knowledge of the array geometry and is hard to extend to LIS systems with unknown array structures. Second, the compressive sensing-based solution relies on the sparsity of the channels and its performance becomes limited in scenarios with rich non-line-of-sight (NLOS) scattering. This is illustrated in FIG. 3, as the compressive sensing-based solution requires a higher ratio of the LIS elements 18 to be active channel sensing elements 24 to approach the upper bound in the 3.5 GHz scenario that has more scattering than the mmWave 28 GHz case. Further, the compressive sensing-based solution does not leverage the previous observations to improve the current channel recovery. These limitations motivate a deep learning-based solution (e.g., artificial intelligence-based solution), as described in the next section.

VI. Deep Learning-Based LIS Interaction Design

This section introduces an application of deep learning (e.g., artificial intelligence) in the reflection beamforming design problem of LISs 12. The section is organized as follows: First, the key idea of the proposed deep learning-based reflection beamforming design is explained. Then, the system operation and the adopted deep learning model are diligently described.

A. The Key Idea

LISs 12 are envisioned as key components of future networks. The LISs 12 interact with incident signals (e.g., by reflecting them) in a way that improves wireless communication performance. In order to decide on this interaction, however, the LIS systems or their operating base stations and access points need to acquire some knowledge about the channels between the LIS 12 and the transmitter 14 and receiver 16. However, the massive number of antennas at the LISs 12 makes obtaining the required channel knowledge associated with (i) prohibitive training overhead if all the LIS elements 18 are passive reconfigurable reflecting elements 22 or (ii) infeasible hardware complexity/power consumption in the case of fully digital or hybrid based LIS architectures.

Figure 4:
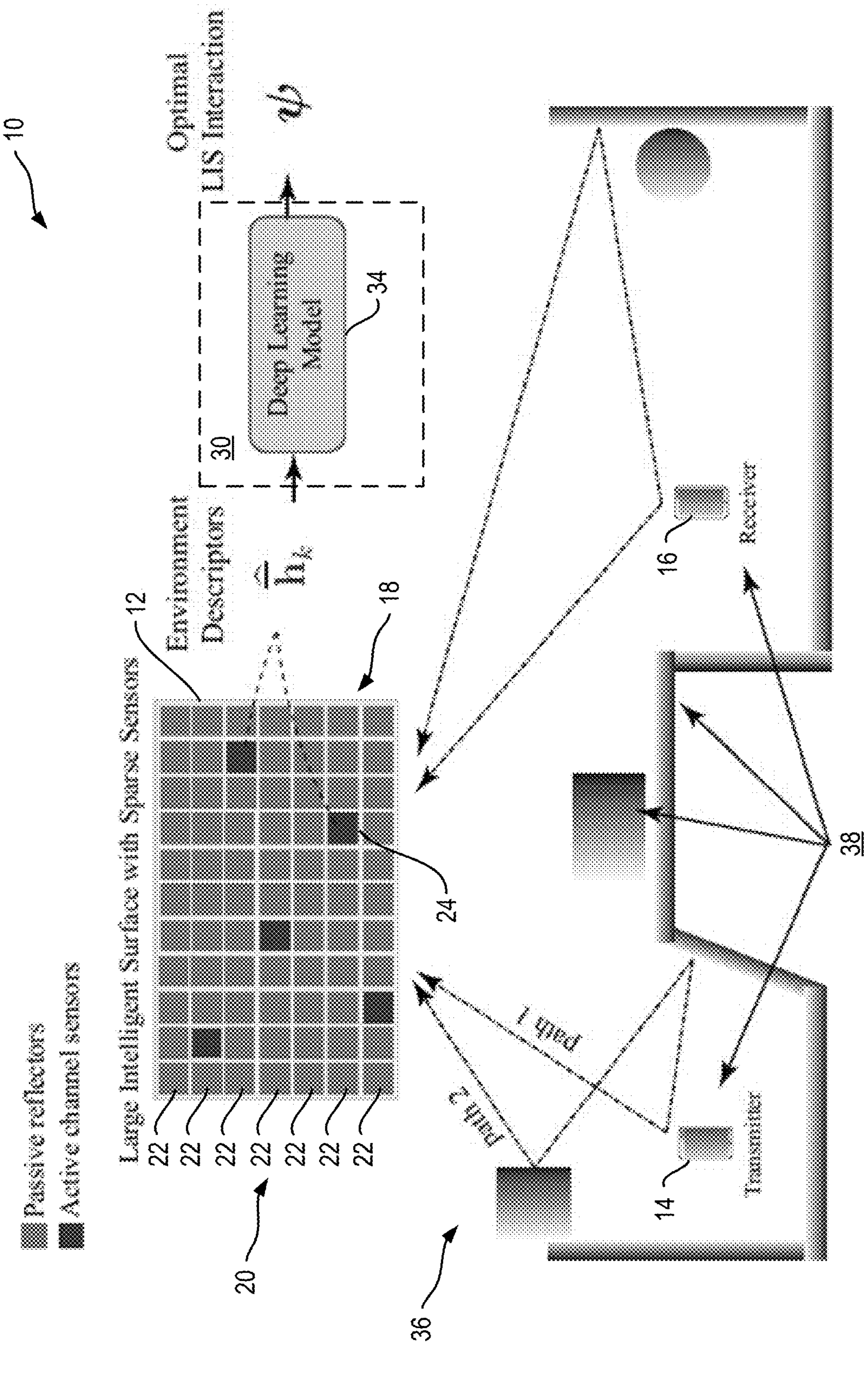
FIG. 4 is a schematic diagram of an exemplary deep learning model that learns how to map observed environment descriptors to an optimal LIS reflection vector.

FIG. 4 is a schematic diagram of the LIS architecture 20 of FIG. 2 implementing a deep learning model 34 that learns how to map observed environment descriptors to an optimal LIS reflection vector. The deep learning model applies deep learning in the reflection beamforming design problem of LISs 12. The channel vectors/matrices are intuitively some functions of the various features of an environment 36 surrounding the LIS 12, such as the geometry, scatterer materials 38, the transmitter 14 and receiver 16 locations, and so on. Unfortunately, the nature of this function—its dependency on the various components of the environment—makes its mathematical modeling very hard and infeasible in many cases. However, this dependence means that the interesting role the LIS 12 plays could be enabled with some form of awareness about the surrounding environment.

With this motivation, and adopting the proposed LIS architecture 20 in FIG. 2, the sampled channels seen by the few active channel sensing elements 24 of the LIS 12 are considered as environment descriptors capturing a multi-path signature, as illustrated in FIG. 4. Accordingly, the deep learning model 34 is deployed (e.g., on the LIS controller 30 and/or a remote processing device, such as a network server, edge server, or cloud server) to learn the mapping function from these environment descriptors and the optimal LIS interaction (reflection beamforming) vectors.

In other words, the LIS system is taught how to interact with the wireless signal given the knowledge of the environment descriptors (e.g., sampled channel vectors). It is worth emphasizing here that the sampled channel vectors can be obtained with negligible training overhead, as explained in Section IV. In the ideal case, the deep learning model 34 is able to predict the optimal interaction vector given the environment descriptors. Achieving this means that the LIS system can approach the optimal rate in Eqn. 9 with negligible training overhead (that is required to obtain the sampled channel vectors) and with low-complexity architectures (as only a few elements of the LIS 12 are active channel sensing elements 24).

In some examples, the LIS 12 includes one or more additional sensors or otherwise receives sensor data. For example, the LIS 12 can include or be connected to a video sensor, an audio sensor, a radar sensor, a position sensor, or a combination of two or more such sensors. The LIS controller 30 can adjust the passive reconfigurable reflecting elements 22 based on sensor data from these sensors. In further examples, the sensor data may provide environment descriptors for the deep learning model 34 to use for learning the environment and/or resolving the reflection matrix.

B. Proposed System Operation

This section describes the system operation of the proposed deep learning-based LIS interaction approach. The proposed system operates in two phases, namely (I) the learning phase and (II) the prediction phase.

Phase I: Learning Phase

In Phase I (the learning phase) the LIS 12 (e.g., using the LIS controller 30) employs an exhaustive search reflection beamforming approach (as further explained below) while it is collecting the dataset for the deep learning model 34. Once the dataset is fully acquired, the LIS controller 30 trains the deep learning model 34. Let the term "data sample" indicate the data captured in one coherence block, and define the concatenated sampled channel vector $\bar{\mathbf{h}}=\text{vec}([\bar{\mathbf{h}}_1, \bar{\mathbf{h}}_2, \ldots, \bar{\mathbf{h}}_K])$. Further, let $\bar{\mathbf{h}}(s)$ denote the concatenated sampled channel vector at the sth coherence block, where s=1, . . . , S. S is the total number of data samples used to construct the learning dataset, needed for training the deep learning model 34. As depicted in Algorithm 1 below, at every coherence block s, the proposed LIS system operation consists of four steps, namely (1) estimating the sampled channel vector, (2) exhaustive beam training, (3) constructing a new data point for the learning dataset, and (4) data transmission.

Algorithm 1 Deep Learning Based Reflection Beamforming Prediction

```
Input: Reflection beamforming codebook 𝓟.
    Phase I: Learning phase
  for s = 1 to S do            ▷ For every channel coherence block
      LIS receives two pilots to estimate ĥ̄(s).
      for n = 1 to |𝓟| do                    ▷ Beam training
          LIS reflects using ψ_n beam.
          LIS receives the feedback R_n(s).
```

-continued

Algorithm 1 Deep Learning Based Reflection Beamforming Prediction

6: Construct $r(s) = [R_1(s), R_2(s), \ldots, R_{|\mathcal{P}|}(s)]^T$.
7: Store new entry in the learning dataset $\mathcal{D} \leftarrow \langle \hat{\mathbf{h}}(s), \mathbf{r}(s) \rangle$.
8: LIS reflects using $\psi_{n^*}$ beam, $n^* = \arg\max_n [r(s)]_n$.
9: Train the DL model using the learning dataset $\mathcal{D}$.
Phase II: Prediction phase
10: while True do ▷ Repeat every channel coherence block
11: LIS receives two pilots to estimate $\hat{\bar{\mathbf{h}}}$.
12: Predict the rate vector $\hat{r}$ using the trained DL model.
13: LIS reflects using $\psi_{n^{DL}}$ beam, $n^{DL} = \arg\max_n [\hat{r}]_n$.

After collecting the dataset with S data samples, the deep learning model 34 is trained. These steps are described in further detail as follows.

1. Sampled channel estimation (lines 1, 2): For every channel coherence block s, the transmitter 14 and receiver 16 transmit two orthogonal uplink pilots. The active channel sensing elements 24 of the LIS 12 receive these pilots and estimate the sampled channel vectors to construct the multipath signature, which is expressed as:

$$\hat{h}_{T,k}(s) = \bar{h}_{T,k}(s) + v_k, \quad \hat{h}_{R,k}(s) = \bar{h}_{R,k}(s) + w_k \tag{Eqn. 21}$$

$$\hat{h}_k(s) = \hat{h}_{T,k}(s) \odot \hat{h}_{R,k}(s) \tag{Eqn. 22}$$

$$\hat{h}(s) = vec\left(\left[\hat{h}_1(s), \hat{h}_2(s), \ldots, \hat{h}_K(s)\right]\right) \tag{Eqn. 23}$$

where $$v_k, w_k \sim \mathcal{N}_{\mathbb{C}}(0, \sigma_n^2 \mathbf{I})$$

are the receive noise vectors at the active channel sensing elements 24 of the LIS 12.

2. Exhaustive beam training (lines 3-6): In this step, the LIS controller 30 performs an exhaustive search over reflection code words using the reflection codebook $\mathcal{P}$. Specifically, the LIS controller 30 attempts every candidate reflection beamforming vector $\psi_n$, n=1, . . . , $|\mathcal{P}|$, and receives a feedback from the receiver 16 indicating the achievable rate attained by using this interaction vector, $R_n(s)$, which is defined as $$R_n(s) = \frac{1}{K}\sum_{k=1}^{K} \log_2\left(1 + SNR\left|(h_{T,k}(s) \odot h_{R,k}(s))^T \psi_n\right|^2\right) \tag{Eqn. 24}$$

Note that, in practice, the computation and feedback of the achievable rate $R_n(s)$ has some error compared with Eqn. 24 due to the limitations in the pilot sequence length and feedback channel, which are neglected herein. For the rest of this disclosure, the achievable rate vector at the sth coherence block is defined as $r(s)=[R_1(s), R_2(s), \ldots, R_{|\mathcal{P}|}(s)]^T$.

3. Learning dataset update (line 7): The new data entry comprised of the sampled channel vector $\hat{\bar{h}}(s)$, estimated in step 1, and the corresponding rate vector r(s), constructed in step 2, is added to the deep learning dataset $\mathcal{D}$, such that $\mathcal{D} \leftarrow \langle \hat{\bar{h}}(s), r(s) \rangle$.

4. Data transmission stage (line 8): After the beam training task, given the constructed achievable rate vector r(s), the best reflection beamforming vector, $\psi_{n^*}$, that corresponds to the highest achievable rate $n^*=\arg\max_n [r(s)]_n$, is used to reflect the transmitted data from the transmitter 14 for the rest of the coherence block.

Figure 5:
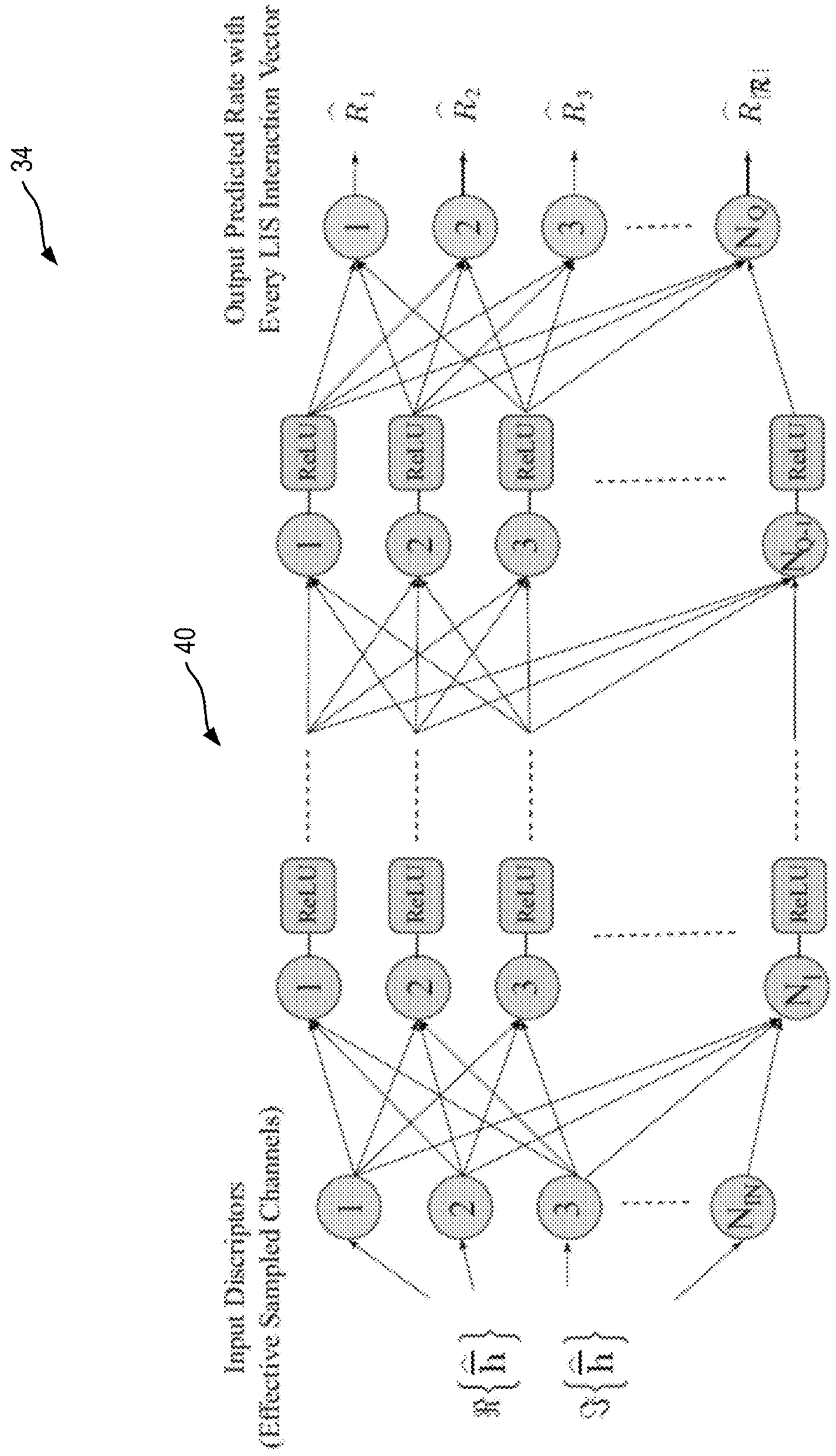
FIG. 5 illustrates an adopted neural network architecture consisting of fully connected layers.

5. Deep learning model training (line 9): After acquiring the data entries for all S coherence blocks, the deep learning model 34 is trained using the entire dataset $\mathcal{D}$. This model learns how to map an input (the sampled channel vector $\hat{\bar{h}}$) to an output (predicted achievable rate) with every candidate interaction vector $\hat{r}=[\hat{R}_1, \hat{R}_2, \ldots, \hat{R}_{|\mathcal{P}|}]$, as shown in FIG. 5. It is worth mentioning here that while it is assumed that the system switches one time to Phase II after the deep learning model 34 is trained, in some examples the system retrains and refines the model frequently to account for changes in the environment.

Phase II: Prediction Phase

Following the deep learning model 34 training in Phase I, the LIS controller 30 leverages the trained deep learning model 34 to predict the reflection beamforming vector directly from the estimated sampled channel vector, $\hat{\bar{h}}$. As shown in Algorithm 1 above, Phase II performs the following steps for every channel coherence block:

1. Sampled channel estimation (line 11): This step is the same as the first step in Phase I. The active channel sensing elements 24 of the LIS 12 receive uplink pilots to estimate and construct the concatenated sampled channel vector, $\hat{\bar{h}}$.
2. Achievable rate prediction (line 12): In this step, the estimated sampled channel vector, $\hat{\bar{h}}$, is fed into the deep learning model 34, trained in Phase I, to predict the achievable rate vector, $\hat{r}$, which will be used for predicting the best deep learning-based reflection beamforming vector.
3. Data transmission (line 13): In this step, the predicted deep learning reflection beamforming vector, $\psi_{n^{DL}}$, that corresponds to the highest predicted achievable rate, where $n^{DL}=\arg\max_n[\hat{r}]_n$, is used to reflect the transmitted data (signal) from the transmitter for the rest of the coherence block. Note that instead of selecting only the interaction vector with the highest predicted achievable rate, the LIS controller 30 can generally select the $k_B$ beams corresponding to the $k_B$ highest predicted achievable rates. It can then refine this set of beams online with the receiver 16 to select the one with the highest achievable rate. In Section VII-F, the performance gain is evaluated if more than one reflection beam, i.e., $k_B$ reflection beams, are selected.

C. Deep Learning Model

FIG. 5 is a schematic diagram of an exemplary deep learning model 34 that learns how to map observed environment descriptors to an optimal LIS reflection vector. Recent years have proved deep learning to be one of the most successful machine learning paradigms. With this motivation, a neural network 40 is chosen as an exemplary deep learning model 34 with which the desired LIS interaction function is learned. In the following, the components of the neural network 40 are described.

Input Representation: A single input to the neural network 40 is defined as a stack of environment descriptors (sampled channel vectors $\hat{\bar{h}}_k$) obtained from a pair of transmitter 14 and receiver 16 at K different sub-carrier frequencies. This sets the dimensionality of a single input vector to $K\bar{M}$. A common practice in machine learning is the normalization of the input data. This guarantees a stable and meaningful learning process. The normalization method of choice here is a simple per-dataset scaling; all samples are multiplied by a factor that is the inverse of the maximum absolute value over the whole input data:

$$\hat{\bar{h}}_{norm} = \frac{\hat{\bar{h}}(s)}{\max_s \left\| \hat{\bar{h}}(s) \right\|_\infty}, s = 1, \ldots , S \quad \text{(Eqn. 25)}$$

Besides helping the learning process, this normalization choice preserves distance information encoded in the environment descriptors. This way the model learns to become more aware of the surroundings, which is the bedrock for proposing a machine-learning-powered LIS 12.

The last pre-processing step of input data is to convert the data into real-valued vectors without losing the imaginary part information. This is done by splitting each complex entry into real and imaginary values, doubling the dimensionality of each input vector. The main reason behind this step is the modern implementations of deep learning models, which mainly use real-valued computations.

Target Representation: The learning approach used in this model is supervised learning. This means the model is trained with input data that are accompanied with their so-called target responses. They are basically the desired responses the model is expected to approximate when it encounters inputs like those in the input training data. The aim of the training process is to learn a function which maps environmental descriptors to reflection vectors; therefore, the model is designed to output a set of predictions on the achievable rates of every possible reflection beamforming vector in the codebook $|\mathcal{P}|$. Hence, the training targets are real-valued vectors, r(s), s=1, . . . , S, with the desired rate for each possible reflection vector.

For the same training efficiency reason expressed for the input representation, the labels are usually normalized. The normalization used in this model is pre-sample scaling where every vector of rates r(s) is normalized using its maximum rate value $\max_n[r(s)]_n$. The output of the normalization process is denoted by $\bar{r}(s)$. The choice of normalizing each vector independently guards the model from being biased towards some strong responses. In terms of the proposed LIS 12, it gives the receivers 16 equal importance regardless of how close or far they are from the LIS 12.

Neural Network Architecture: The neural network 40 is designed as a multi-layer perceptron (MLP) network, sometime referred to as a feedforward fully connected network. It is well-established that MLP networks are universal function approximators. This motivates adopting an MLP network to capture the relation between the environment descriptors and the LIS interaction (reflection beamforming) vectors.

The proposed MLP model consists of Q layers, as illustrated in FIG. 5. The first Q−1 of the layers alternate between fully connected and non-linearity layers and the last layer (output layer) is a fully connected layer. The qth layer in the network has a stack of $N_q$ neurons, each of which sees all the outputs of the previous layer. For the non-linearity layers, they all employ rectified linear units (ReLUs). Each unit operates on a single input value outputting another single value. Hence, the number of units per layer equals the number of outputs of the previous fully connected layer.

Training Loss Functions: The model training process aims at minimizing a loss function that measures the quality of the model predictions. Given the objective of predicting the best reflection beam vector, $\psi_{n^{DL}}$, having the highest achievable rate estimate, $\max_n \hat{R}_n$, the model is trained using a regression loss function. At every coherence block, the neural network 40 is trained to make its output, $\hat{r}$, as close as possible to the desired output, the normalized achievable rates, $\bar{r}$. Specifically, the training is guided through minimizing the loss function, L (θ), expressed as:

$$L(\theta) = MSE(\bar{r}, \hat{r}) \quad \text{(Eqn. 26)}$$

where θ represents the set of all the neural network parameters and $MSE(\bar{r},\hat{r})$ indicates the mean-squared-error between $\bar{r}$ and $\hat{r}$.

VII. Simulation Results

In this section, the performance of both the deep learning and the compressive sensing-based reflection beamforming approaches are evaluated. The flow of this section is as follows. First, the adopted experimental setup and datasets are described. Then, the performance of the deep learning and compressive sensing solutions are compared at both mmWave and sub-6 GHz bands. After that, the impact of different system and machine learning parameters on the performance of the deep learning solution are investigated.

A. Simulation Setup

Given the geometric channel model adopted in Section II (see FIG. 2) and the nature of the reflection beamforming optimization problem, with its strong dependence on the environmental geometry, it is critical to evaluate the performance of the proposed solutions based on realistic channels. This motivates using channels generated by ray-tracing to capture the dependence on the key environmental factors such as the environment geometry and materials, the LIS 12 and transmitter 14 receiver 16 locations, the operating frequency, etc. To do that, the DeepMIMO dataset was used, as described above with respect to Section V-B. The DeepMIMO dataset is a parameterized dataset published for deep learning applications in mmWave and massive MIMO systems. The machine learning simulations were executed using the Deep Learning Toolbox of MATLAB R2019a. Next, the key components of the simulation setup are explained in detail.

Figure 6:
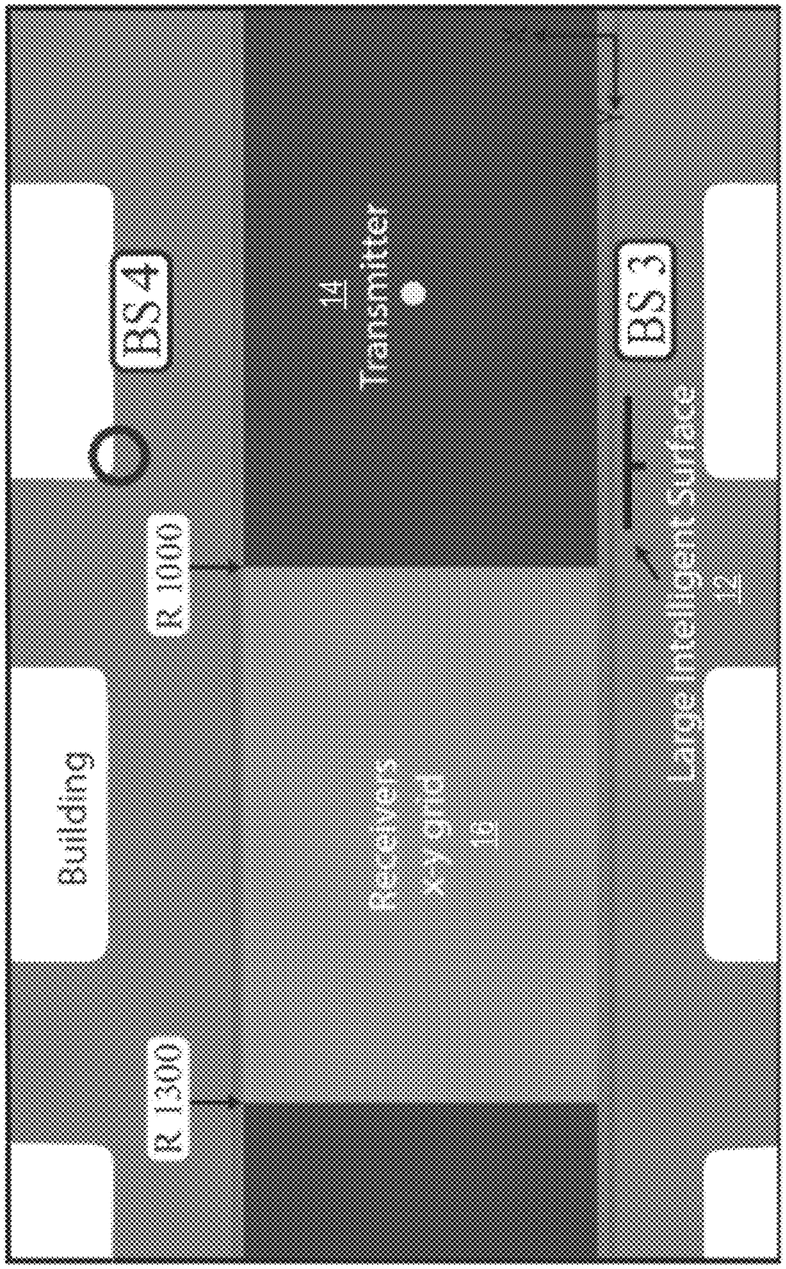
FIG. 6 is a schematic diagram of an exemplary ray-tracing scenario where an LIS reflects a signal received from one fixed transmitter to a receiver.

System model: FIG. 6 is a schematic diagram of an exemplary ray-tracing scenario where an LIS 12 reflects a signal received from one fixed transmitter 14 to a receiver 16. The simulation setup adopts the system model described in Section II-A (see FIG. 1), with one LIS 12 that reflects the signal received from a transmitter 14 to a receiver 16. The transmitter 14 is assumed to be fixed while the receiver 16 can take any random position in a specified x-y grid, as illustrated in FIG. 6. Using the DeepMIMO dataset, BS 3 in the 'O1' scenario is selected to be the LIS 12 and the user in row R850 and column 90 is selected to be the fixed transmitter 14. The uniform x-y grid of candidate receiver 16 locations includes 54300 points from row R1000 to R1300 in the 'O1' scenario, where every row consists of 181 points. Unless otherwise mentioned, the adopted LIS 12 employs a UPA with 64×64 (M=4096) antennas at the mmWave 28 GHz setup and a UPA with 16×16 (M=256) antennas at the 3.5 GHz setup. The active channel sensing elements 24 of FIG. 2 are randomly selected from the M UPA antennas. The transmitter 14 and receiver 16 are assumed to have a single antenna each with a gain of 3 dBi and the transmit power is 35 dBm. The rest of the adopted DeepMIMO dataset parameters are summarized in Table I below.

TABLE I

THE ADOPTED DEEPMIMO DATASET PARAMETERS

| DeepMIMO Dataset Parameter | Value |
|---|---|
| Frequency band | 3.5 GHz or 28 GHz |
| Active BSs | 3 |
| Number of BS Antennas | $(M_x, M_y, M_z) \in \{(1, 16, 16); (1, 32, 32); (1, 64, 64)\}$ |
| Active users (receivers) | From row R1000 to row R1300 |
| Active user (transmitter) | row R850 column 90 |
| System bandwidth | 100 MHz |
| Number of OFDM subcarriers | 512 |
| OFDM sampling factor | 1 |
| OFDM limit | 64 |
| Number of channel paths | {1, 2, 5, 10} |
| Antenna spacing | 0.5λ |

Channel generation: The channels $h_{T,k}$, $h_{R,k}$ between the LIS 12 and the transmitter 14 and receiver 16, for all the candidate receiver 16 locations in the x-y grid, are constructed using the DeepMIMO dataset generation code with the parameters in Table I. With these channels and given the randomly selected active channel sensing elements 24 in the proposed LIS architecture 20, the sampled channel vectors $\bar{h}_{T,k}$, $\bar{h}_{R,k}$ are constructed. The noisy sampled channel vectors $\hat{\bar{h}}_{T,k}$, $\hat{\bar{h}}_{R,k}$ are then generated by adding noise vectors to $\bar{h}_{T,k}$, $\bar{h}_{R,k}$ according to Eqn. 23, with the noise power calculated based on the bandwidth and other parameters in Table I, and with receiver 16 noise figure of 5 dB. These noisy sampled channels are then used to design the LIS interaction (reflection beamforming) vectors following the proposed compressive sensing and deep learning approaches.

LIS interaction (reflection beamforming) codebook: A DFT codebook is adopted for the candidate LIS interaction vectors. More specifically, considering the UPA structure, the LIS interaction codebook is defined as $DFT_{M_H} \otimes DFT_{M_V}$. The codebook $DFT_{M_H} \in \mathbb{C}^{M_H \times M_H}$ is a DFT codebook for the azimuth (horizontal) dimension where the $m_H$th column, $m_H=1, 2, \ldots, M_H$, is defined as $$\left[1, e^{-j\frac{2\pi}{M_H}m_H}, \ldots, e^{-j(M_H-1)\frac{2\pi}{M_H}m_H}\right]^T.$$

The codebook $DFT_{M_V}$ is similarly defined for the elevation (vertical) dimension.

Figure 7:
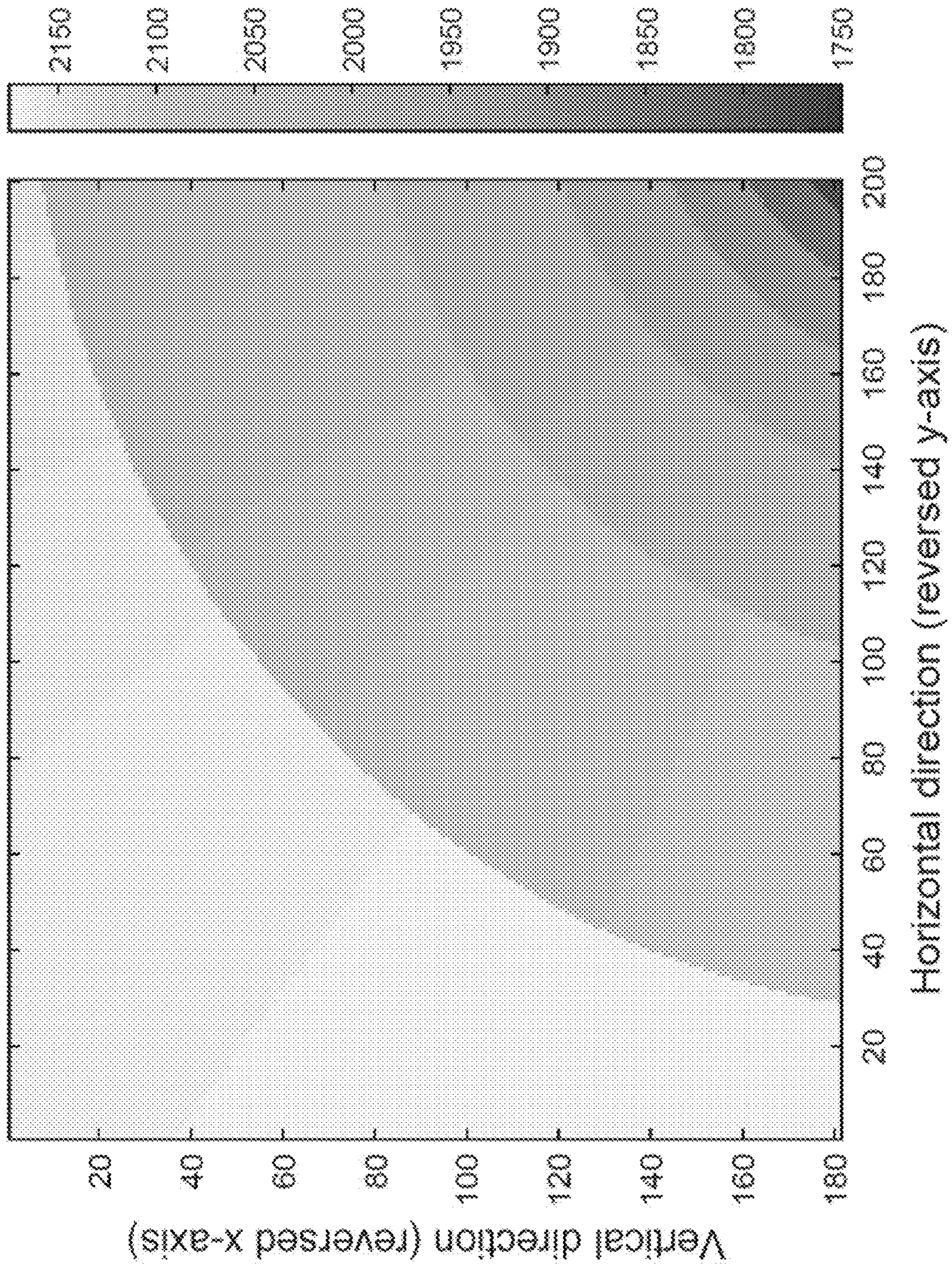
FIG. 7 illustrates an optimal index map of the LIS reflection beamforming codebook at $f_c$=28 GHz, M=64×64 antennas, and L=1 channel path.

As an example, FIG. 7 illustrates an optimal index map of the LIS reflection beamforming codebook at $f_c$=28 GHz, M=64×64 antennas, and L=1 channel path. The map orientation and directions are set according to the adopted ray-tracing scenario, previously shown in FIG. 6. The pixel position represents the candidate location of the receiver on the x-y grid under-study. The pixel color represents the index number of the optimal reflection beamforming vector for each candidate location, calculated according to Eqn. 8, under the assumption of perfect full channel knowledge, $h_{T,k}$ and $h_{R,k}$, at the LIS.

Figure 8:
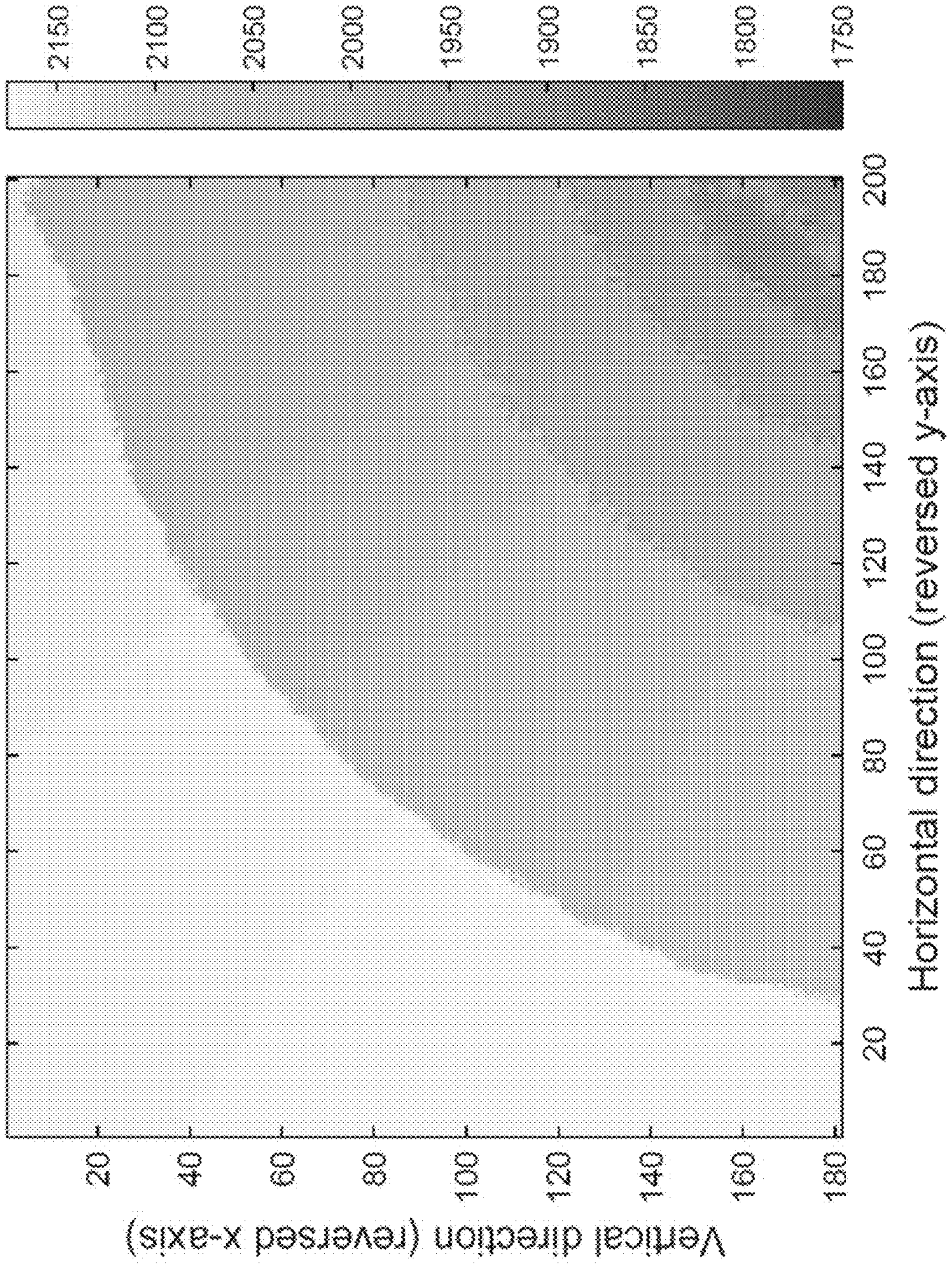
FIG. 8 illustrates a predicted index map of the LIS reflection beamforming codebook using the proposed deep learning-based reflection beamforming with only $\overline{M}$=8 active channel sensors.

By comparison, FIG. 8 illustrates a predicted index map of the LIS reflection beamforming codebook using the proposed deep learning-based reflection beamforming with only $\bar{M}$=8 active channel sensing elements 24.

Deep learning parameters: The deep learning model is adopted as described above in Section VI-C. To reduce the neural network complexity, however, the normalized sampled channels are only input at the first $K_{DL}$=64 subcarriers, k=1, . . . , $K_{DL}$ and $K_{DL} \leq K$, which sets the length of the deep learning input vector to be $2\bar{M}K_{DL}$. This is motivated by the fact that the channel is highly correlated in the frequency domain resulting from the sparsity of the channel, the mmWave channel in particular.

The length of the deep learning output vector is $M=|\mathcal{P}|$, as described in Section VI-C. The neural network architecture consists of four fully connected layers. Unless otherwise mentioned, the number of hidden nodes of the four layers is (M, 4M, 4M, M), respectively, where M is the number of LIS antennas. Given the size of the x-y grid of the candidate receiver 16 locations in FIG. 6, the deep learning dataset has 54300 data points. This dataset is split into two sets, a training set and a testing set, with 85% and 15% of the points respectively. A dropout layer is added after every ReLU layer. Unless otherwise mentioned, a batch size of 500 samples, a 50% dropout rate, an $L_2$ regularization factor of $10^{-4}$, and 20 epochs of training are considered. The learning rate starts from 0.1 and drops by 50% every 3 epochs.

Compressive sensing parameters: The compressive sensing solution described above in Section V is used to recover the full LIS-transmitter/receiver channels and design the LIS reflection beamforming vectors. For approximating the solution of Eqn. 20, OMP is used with a grid of size $$N_D^{Az} N_D^{El}$$

points, where $$N_D^{Az} = 2M_H,\ N_D^{El} = 2M_V.$$

Next, given this described setup, and adopting the LIS architecture 20 of FIG. 2 with only $\bar{M}$ active channel sensing elements 24, the performance of the developed compressive sensing and deep learning solutions are evaluated.

B. Achievable Rates with Compressive Sensing and Deep Learning-Based LIS Systems In this subsection, the achievable rates are evaluated of the proposed compressive sensing and deep learning-based reflection beamforming solutions for LIS systems, as previously described in Section V-A and Section VI-B, respectively. The achievable rates are compared with the genie-aided upper bound, R*, in Eqn. 9, which assumes perfect knowledge of the full channel vectors $h_{T,k}$, $h_{R,k}$ at the LIS 12. The average achievable rate used for accessing the performance of these proposed solutions can be formulated as:

$$R = \frac{1}{K}\sum_{k=1}^{K} \log_2\left(1 + SNR\left|\left(h_{T,k}(s) \odot h_{R,k}(s)\right)^T \psi\right|^2\right) \quad \text{(Eqn. 27)}$$

where $\psi \in \{\psi_{n^{cs}}, \psi_{n^{DL}}\}$ is the reflection beamforming vector chosen by the compressive sensing or deep learning-based reflection beamforming solutions, respectively. To reduce the computational complexity of the performance evaluation, the achievable rate summation is computed over the first subcarrier instead of computing over all the K=512 subcarriers.

Figure 9:
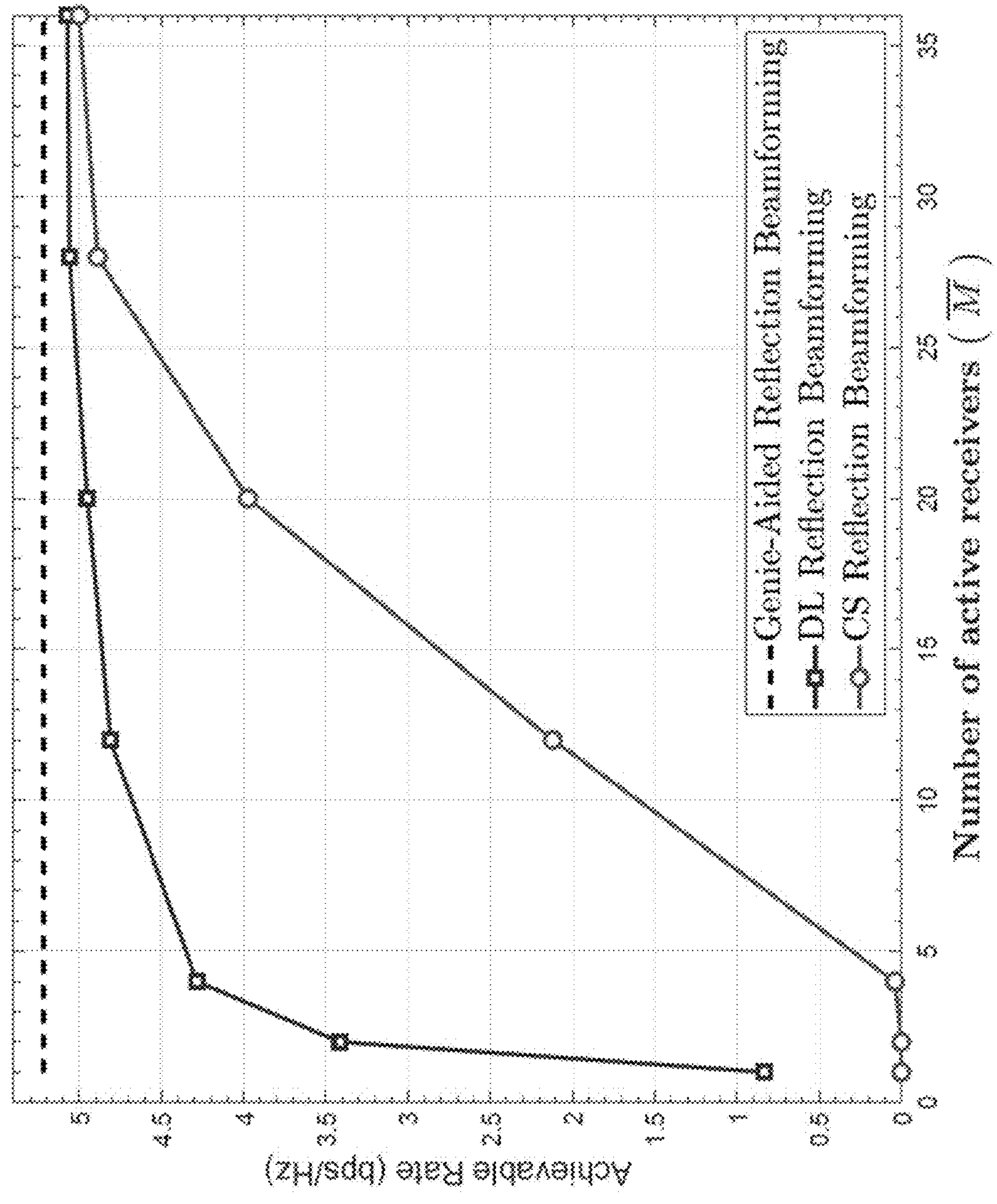
FIG. 9 is a graphical representation of achievable rates of proposed compressive sensing and deep learning-based reflection beamforming solutions compared with an upper bound.

FIG. 9 is a graphical representation of achievable rates of proposed compressive sensing and deep learning-based reflection beamforming solutions compared with an upper bound. FIG. 9 is plotted using the simulation setup in Section VII-A at the mmWave 28 GHz band with LIS 12 employing a UPA of 64×64 antennas. The channels are constructed to include the strongest L=10 channel paths. Further, the LIS 12 employs the proposed architecture in FIG. 2 with only $\overline{M}$ active channel sensing elements 24. FIG. 9 shows that the proposed deep learning solution approaches the optimal upper bound with a very small number of active antennas. For example, with only $\overline{M}$=4 active antennas (out of M=4096 total antennas), the deep learning solution achieves almost 85% of the optimal achievable rate.

FIG. 9 also illustrates the performance gain of the deep learning solution compared with the compressive sensing approach, especially when the number of active antennas is very small. Note that the two solutions approach the upper bound with 28 to 36 active antennas, which represent less than 1% of the total number of antennas (M=4096) in the LIS 12. This illustrates the high energy efficiency of the proposed LIS architecture 20 and reflection beamforming solutions, as will be demonstrated in the following subsection.

Figure 10:
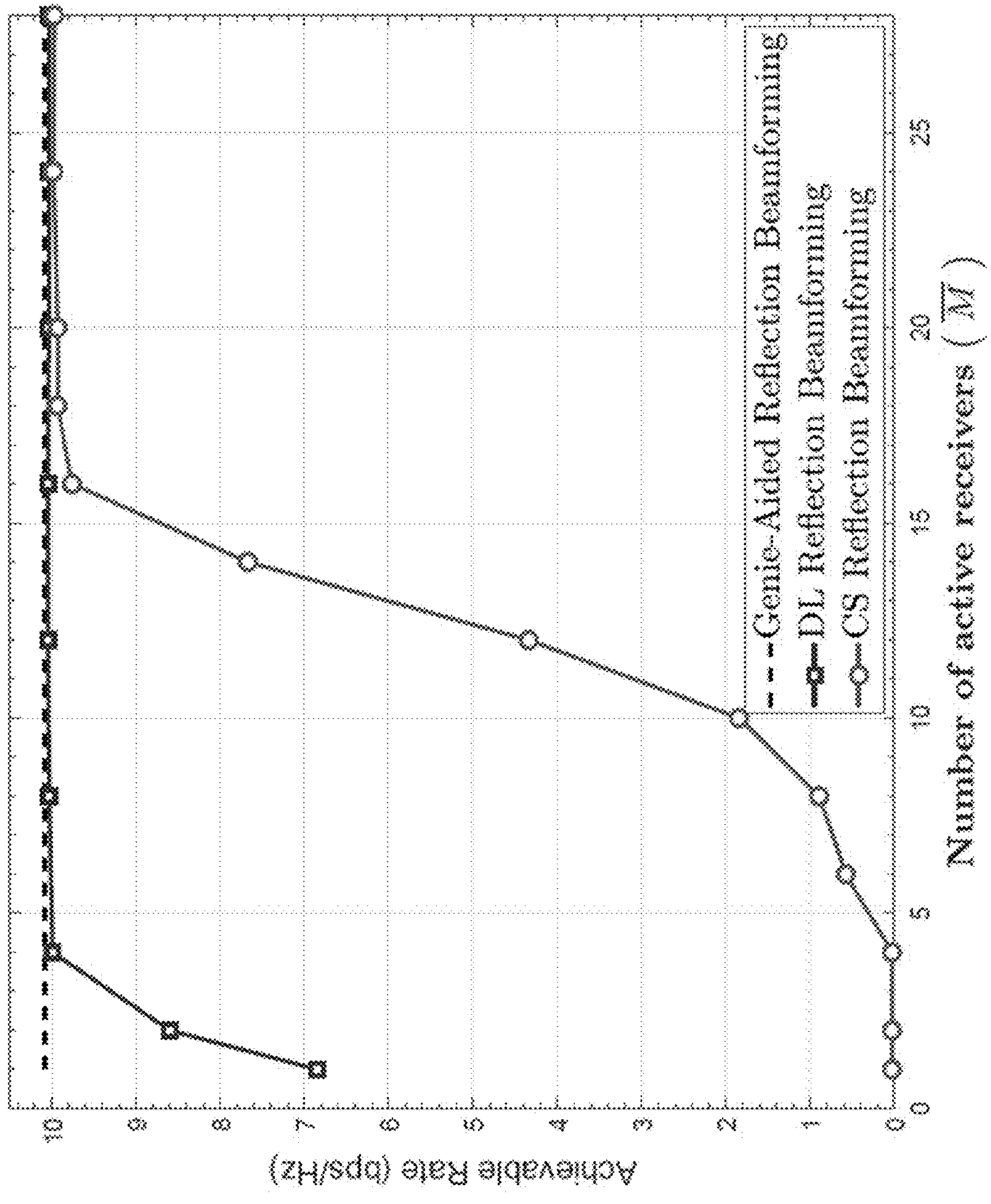
FIG. 10 is a graphical representation of an achievable rate of the proposed deep learning-based reflection beamforming approach compared with an upper bound and the compressive sensing-based beamforming approach for different numbers of active receivers.

FIG. 10 is a graphical representation of an achievable rate of the proposed deep learning-based reflection beamforming approach compared with an upper bound and the compressive sensing-based beamforming approach for different numbers of active receivers. To evaluate the performance at sub-6 GHz systems, FIG. 10 plots the achievable rates compared with the optimal rate R*. The simulation setup of FIG. 6 is adopted at a 3.5 GHz band. The LIS 12 is assumed to employ a UPA with 16×16 antennas, compared with 64×64 in the 28 GHZ band, given the path loss difference between the 3.5 GHz and 28 GHz bands. Each channel incorporates the strongest L=15 paths, compared with L=10 in the 28 GHz band, motivated by the fact that the channels are less sparse in the sub-6 GHz systems compared with the mmWave systems.

FIG. 10 shows that the proposed deep learning and compressive sensing solutions are also promising for sub-6 GHz LIS systems. This is captured by the convergence to the upper bound with only four active channel sensing elements 24 in the deep learning case and around eighteen active channel sensing elements 24 in the compressive sensing case. FIG. 10 also illustrates the gain from employing the deep learning approach over the compressive sensing approach in the sub-6 GHz systems, where the channels are less sparse than mmWave systems. This gain, however, has the cost of collecting a dataset to train the deep learning model, which is not required in the compressive sensing approach.

In FIG. 9 and FIG. 10, since the number of active channel sensing elements 24, $\overline{M}$, is a design parameter, the number of hidden nodes in the four neural network layers is solely optimized for each and every value of $\overline{M}$. The purpose of this optimization is to assess the possible gain attained by employing the deep learning-based reflection beamforming solution as opposed to the compressive sensing counterpart. Consequently, for FIG. 9, the number of hidden nodes in the four neural network layers is (M, 4M, 4M, M) for $\overline{M}$={1, 2, 4, 12, 20} and (3M, 4M, 4M, M) for $\overline{M}$={28, 36}. For FIG. 10, the number of hidden nodes is ($4\overline{M}K_{DL}$, 16384, 16384, M) for all displayed values of $\overline{M}$.

C. Energy Efficiency

In this subsection, the energy efficiency of both proposed compressive sensing and deep learning-based reflection beamforming approaches is evaluated, compared with the upper bound on spectral energy efficiency, which assumes perfect full channel knowledge at the LIS 12. Starting with a formulation of a generic power consumption model for the proposed LIS architecture 20, the energy efficiency is evaluated. Consider the proposed LIS architecture 20 shown in FIG. 2 and described in Section IV, with $\overline{M}$ active channel sensing elements 24 connected to the baseband through fully digital architecture of b-bit analog-to-digital converters (ADCs). Let $P_{BB}$, $P_{RFchain}$, $P_{ADC}$, $P_{PS}$, $P_{LNA}$ denote the power consumption in the baseband processor, RF chains, ADC, phase shifter (passive reflector), and low-noise amplifier (LNA), respectively. The LIS power consumption model, $P_C$, can be generally formulated as:

$$P_C = MP_{PS} + \overline{M}(P_{LNA} + P_{RFchain} + 2P_{ADC}) + P_{BB} \quad \text{(Eqn. 28)}$$

The power consumption of the ADC, $P_{ADC}$, can be further calculated as:

$$P_{ADC} = FOM_W \times f_S \times 2^b \quad \text{(Eqn. 29)}$$

where b is the number of bits, $f_S$ is the Nyquist sampling frequency, and $FOM_W$ is the Walden's figure-of-merit for power efficiency ranking of the ADCs. Finally, the energy efficiency can be formulated as $$\eta_{EE} = \frac{R \times W}{P_C} \text{bits/Joule} \quad \text{(Eqn. 30)}$$

where W is the transmission bandwidth and R is the achievable rate.

Figure 11:
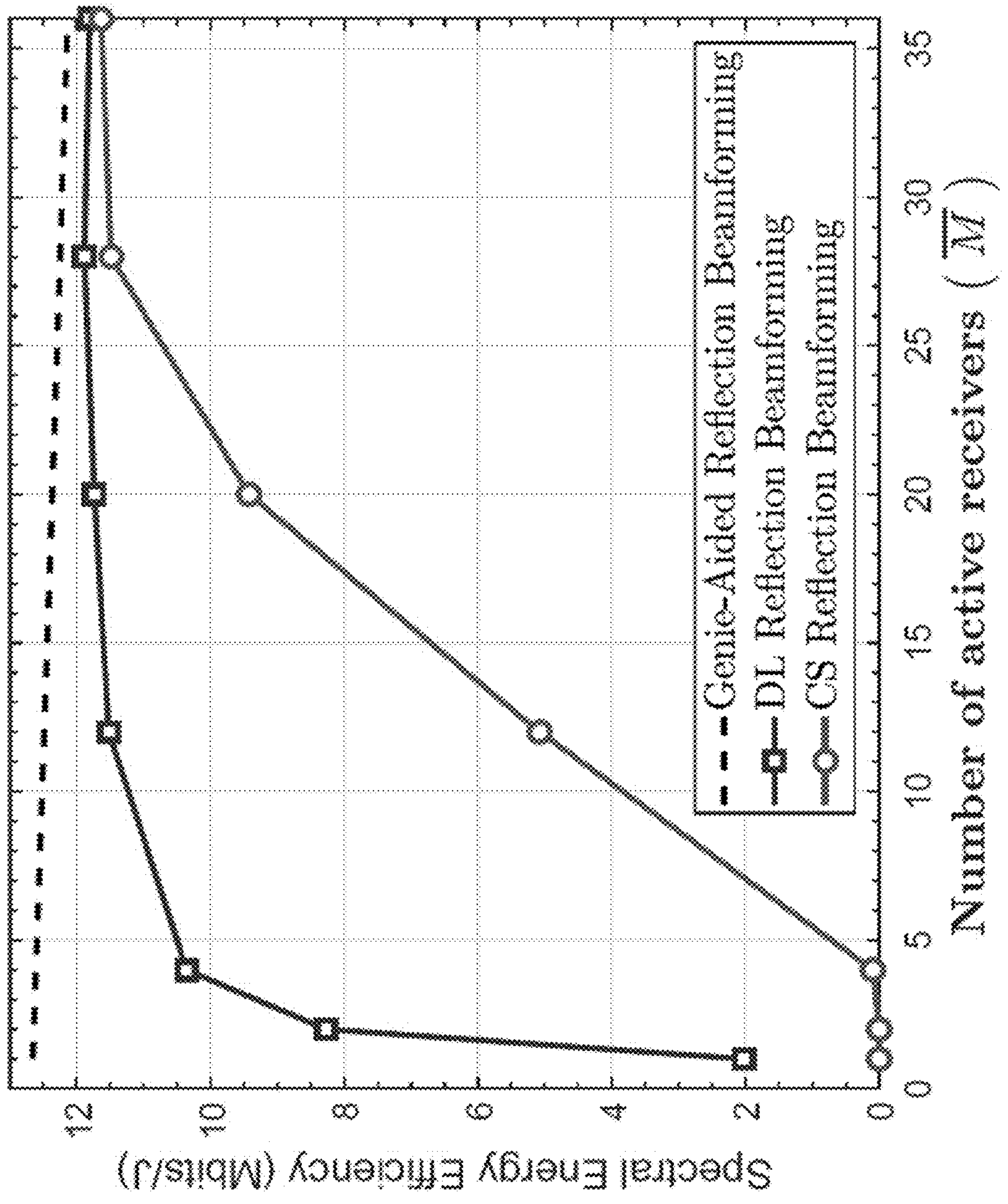
FIG. 11 is a graphical representation of spectral energy efficiency of both proposed compressive sensing and deep learning-based reflection beamforming solutions compared with an upper bound, for different numbers of active receivers.

FIG. 11 is a graphical representation of spectral energy efficiency of both proposed compressive sensing and deep learning-based reflection beamforming solutions compared with an upper bound, for different numbers of active receivers. The energy efficiency is evaluated using Eqns. 28-30. The various power consumption variables are assumed to be $P_{BB}$=200 mW, $P_{RF}$=40 mW, $P_{PS}$=10 mW, $P_{LNA}$=20 mW, and W=100 MHz. Assume b=4 bits according to the trade-off figure between the achievable rate and power consumption for fully digital architecture. Also, assume $FOM_W$=43.1 fJ/conversion-step at 100 MHz bandwidth. In FIG. 11, the energy efficiency values across different numbers of active channel sensing elements 24 are calculated from the achievable rate values of FIG. 9.

FIG. 11 shows the high energy efficiency gained from employing the proposed LIS architecture 20 with few active channel sensing elements 24. Both the proposed compressive sensing and deep learning-based beamforming solutions can approach the upper bound with only 28 to 36 active antennas. The deep learning solution achieves more energy efficiency gains when compared with the compressive sensing solution. Also, according to Eqns. 28-30, since the upper bound is a monotonically decreasing bound when the number of active elements increases, it's safe to state that the optimal operating point for the deep learning-based reflection beamforming approach is at $\overline{M}$=28 active antenna elements, with an optimal energy efficiency of ~12 Mbits/J, for the described scenario only.

D. How Much Training is Needed for the Deep Learning Model?

Figure 12:
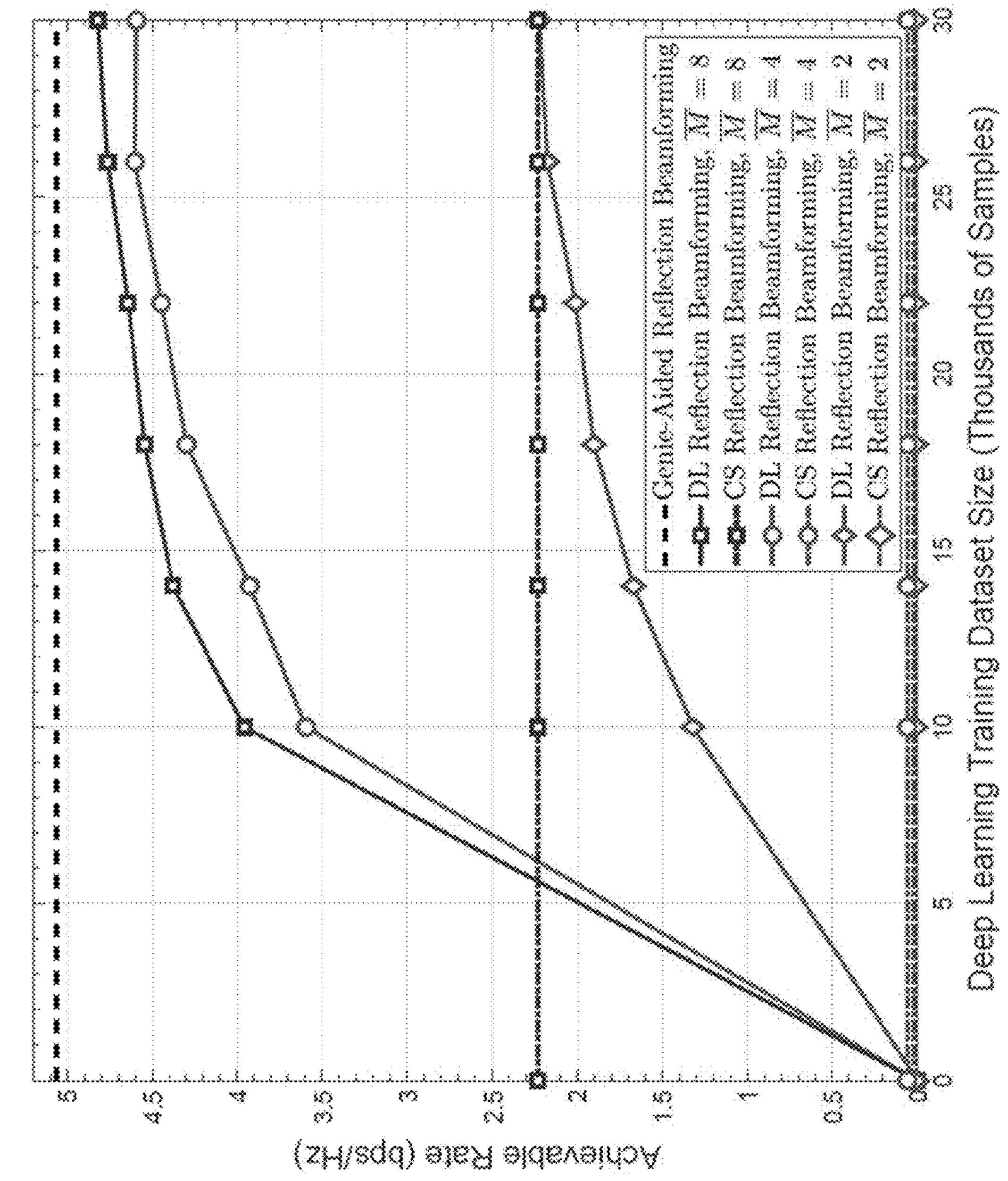
FIG. 12 is a graphical representation of an achievable rate of the proposed deep learning-based reflection beamforming approach compared with an upper bound and the compressive sensing-based beamforming approach for different numbers of active receivers.

FIG. 12 is a graphical representation of an achievable rate of the proposed deep learning-based reflection beamforming approach compared with an upper bound and the compressive sensing-based beamforming approach for different numbers of active receivers. The data samples in the deep learning dataset are captured when the receiver 16 is randomly sampling the x-y grid. FIG. 12 illustrates the performance of the developed deep learning approach for designing the LIS interaction vectors for different dataset sizes. This illustrates the improvement in the machine learning prediction quality as it sees more data samples.

For FIG. 12, the simulation setup of Section VII-A is used with an LIS 12 of 64×64 UPA and a number of active channel sensing elements 24 $\overline{M}$=2, 4, and 8. The setup considers a mmWave 28 GHz scenario and the channels are constructed with only the strongest path, i.e., L=1. FIG. 12 shows that with only 8 active antennas, the proposed deep learning solution can achieve almost 90% of the optimal rate in Eqn. 9 when the model is trained on 10,000 data points (out of the 53400) points in the x-y grid. Further, FIG. 12 highlights the performance gain of the deep learning approach compared with the compressive sensing solution. This gain increases with larger dataset sizes as the compressive sensing solution does not leverage the prior channel estimation/LIS interaction observations and its performance does not depend on the size of the dataset.

E. Impact of Important System and Channel Parameters

In this subsection, the impact is evaluated of the key system and channel parameters on the performance of the developed deep learning solution.

Figure 13:
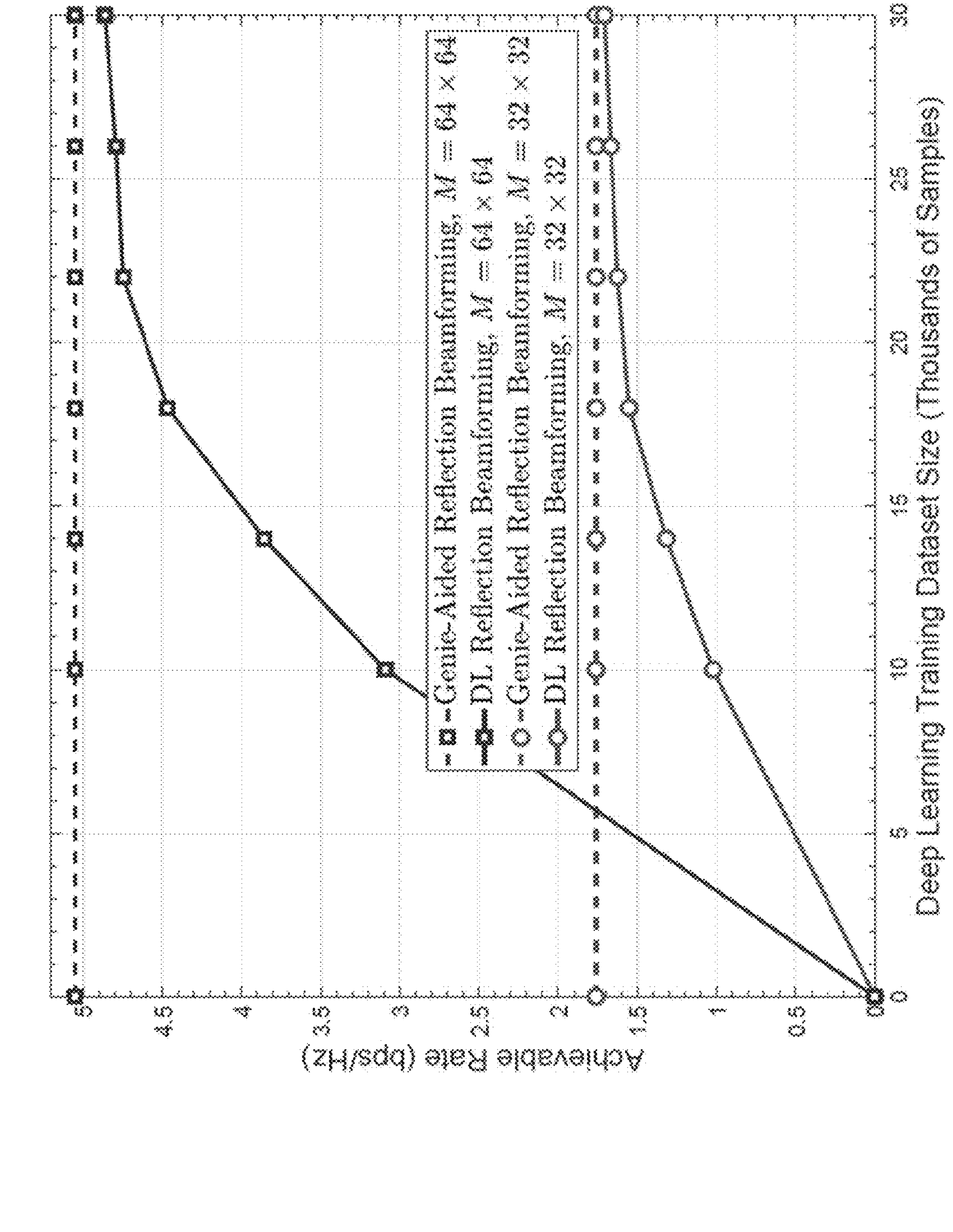
FIG. 13 is a graphical representation of an achievable rate of the proposed deep learning-based reflection beamforming approach compared with the upper bound for different sizes of LISs.

Number of LIS antennas: FIG. 13 is a graphical representation of an achievable rate of the proposed deep learning-based reflection beamforming approach compared with the upper bound for different sizes of LISs 12. FIG. 13 examines the achievable rate performance of the developed solutions for designing the LIS interaction vectors when the LIS 12 employs either a 32×32 or a 64×64 UPA. FIG. 13 adopts the same mmWave scenario considered in FIG. 12. As illustrated, with only $\overline{M}$=8 active receivers, the proposed deep learning solution approaches the optimal rate in Eqn. 9 that assumes perfect channel knowledge for different LIS sizes. This shows the potential of the proposed LIS architecture 20 and deep learning solution in enabling LISs 12 with large numbers of antennas. Note that the proposed solution does not require any beam training overhead (as it relies on the deep learning prediction of the best beam) and needs only 8 active receivers to realize this near-optimal performance in FIG. 13.

Figure 14:
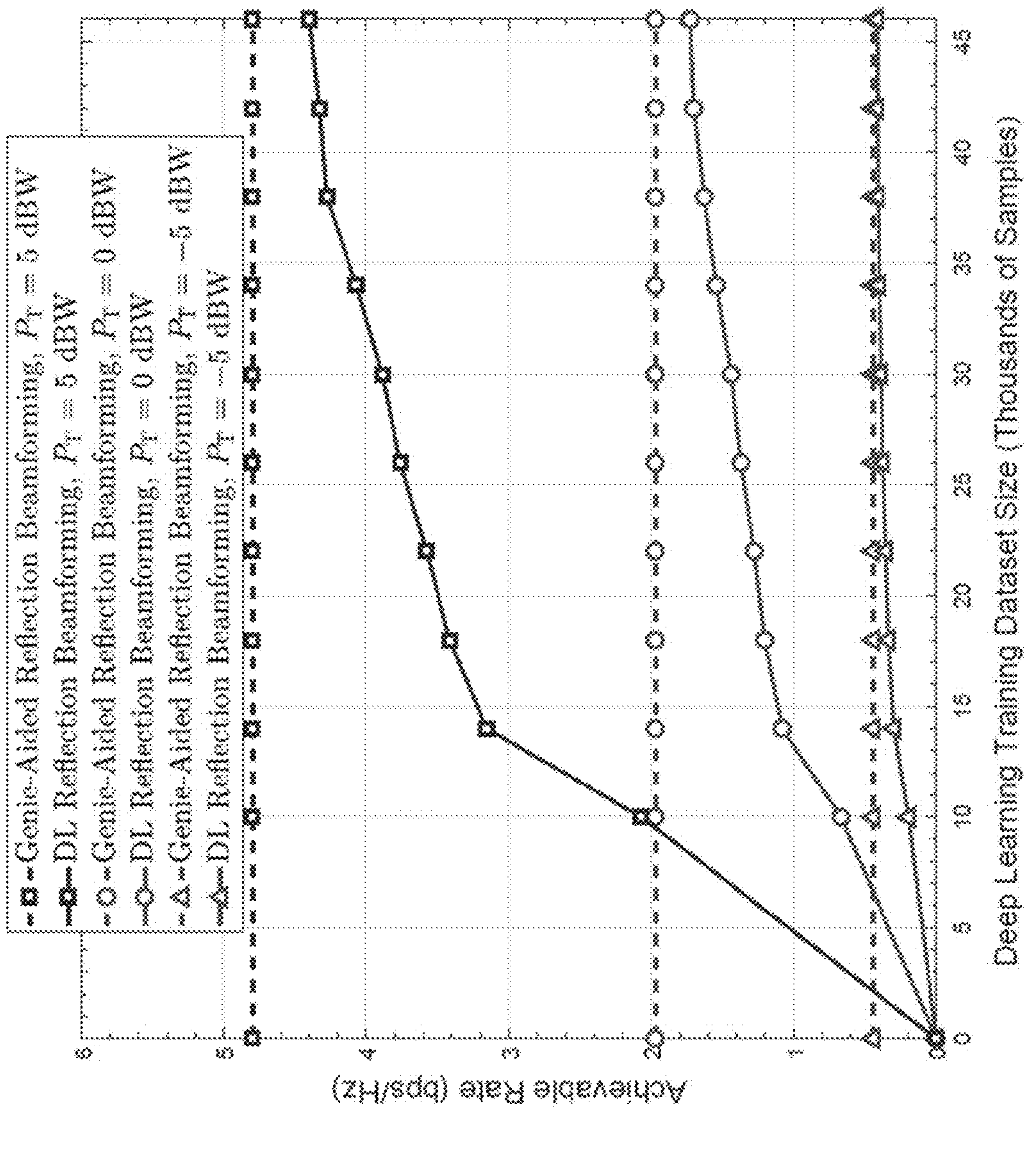
FIG. 14 is a graphical representation of an achievable rate of the proposed deep learning-based reflection beamforming approach compared with the upper bound for different values of user transmit power.

Transmit power: FIG. 14 is a graphical representation of an achievable rate of the proposed deep learning-based reflection beamforming approach compared with the upper bound for different values of user transmit power. FIG. 14 illustrates the impact of the transmit power (and receive SNR) on the achievable rate performance of the developed deep learning solution. This is important in order to evaluate the robustness of the learning and prediction quality, as the noisy sampled channel vectors are input to the deep learning model. In FIG. 14, the achievable rates of the proposed deep learning solution are plotted, as well as the upper bound in Eqn. 9 for three values of the transmit power, $P_T$=−5, 0, 5 dBW. These transmit powers map to receive SNR values of −3.8, 6.2, 16.2 dB, respectively, including the LIS beamforming gain of the 4096 antennas. The rest of the setup parameters are the same as those adopted in FIG. 12. FIG. 14 illustrates that the proposed deep learning solution can perform well even with relatively small transmit powers and low SNR regimes.

Figure 15:
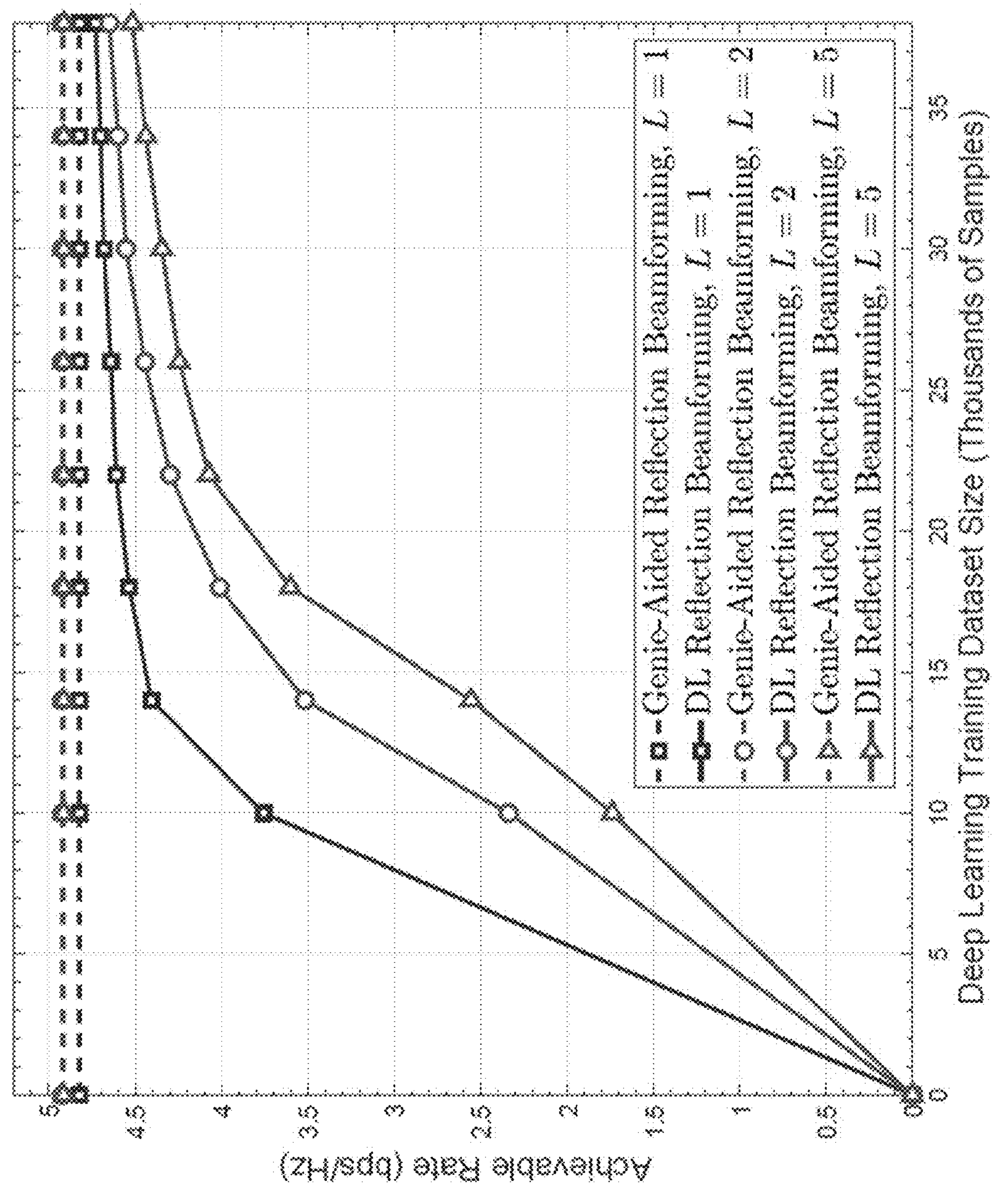
FIG. 15 is a graphical representation of an achievable rate of the proposed deep learning-based reflection beamforming approach compared with the upper bound for different numbers of channel paths.

Number of channel paths: FIG. 15 is a graphical representation of an achievable rate of the proposed deep learning-based reflection beamforming approach compared with the upper bound for different numbers of channel paths. FIG. 15 illustrates the impact of the number of channel paths on the performance of the developed deep learning solution. In other words, it examines the robustness of the proposed deep learning model with multi-path channels. For FIG. 15, the same simulation setup is adopted as FIG. 12 with an LIS 12 employing 64×64 UPA. The channels are constructed considering the strongest L=1, 2, or 5 channel paths. As illustrated in FIG. 15, with the increase in the number of channel paths, the achievable rate by the proposed deep learning solution converges slower to the upper bound. This shows that the proposed deep learning model can learn from multi-path channels if a large enough dataset is available.

F. Refining the Deep Learning Prediction

FIGS. 9 to 15 considered the proposed deep learning solution where the deep learning model uses the sampled channel vectors to predict the best beam, and this beam is directly used to reflect the transmitted data. Relying completely on the deep learning model to determine the reflection beamforming vector has the clear advantage of eliminating the beam training overhead and enabling highly mobile applications. The achievable rates using this approach, however, may be sensitive to small changes in the environment. A candidate approach for enhancing the reliability of the system is to use the machine learning model to predict the most promising $k_B$ beams. These beams are then refined through beam training with the receiver 16 to select the final beam reflection vector. Note that the most promising $k_B$ beams refer to the $k_B$ beams with the highest predicted rates from the deep learning model.

Figure 16:
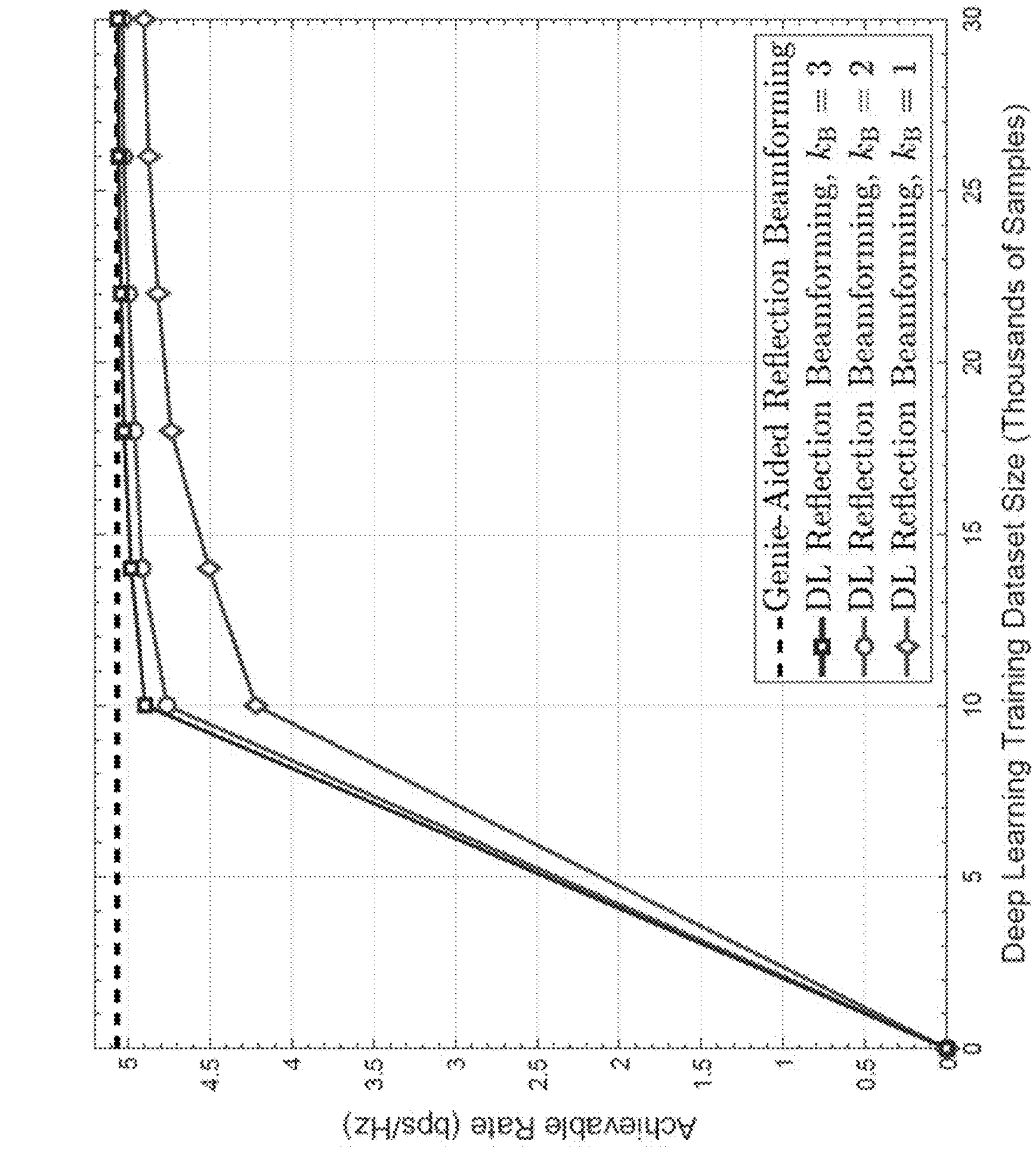
FIG. 16 is a graphical representation of an achievable rate of the proposed deep learning-based reflection beamforming approach compared with the upper bound.

FIG. 16 is a graphical representation of an achievable rate of the proposed deep learning-based reflection beamforming approach compared with the upper bound. To study the performance using this approach, FIG. 16 plots the achievable rate of the deep learning solution for different values of $k_B$. As FIG. 16 shows, refining the most promising $k_B$ yields higher achievable rates compared with the case when the LIS 12 relies completely on the deep learning model to predict the best beam, i.e., with $k_B$. The gain in FIG. 15 is expected to increase with more time varying and dynamic environment.

VIII. Computer System

Figure 17:
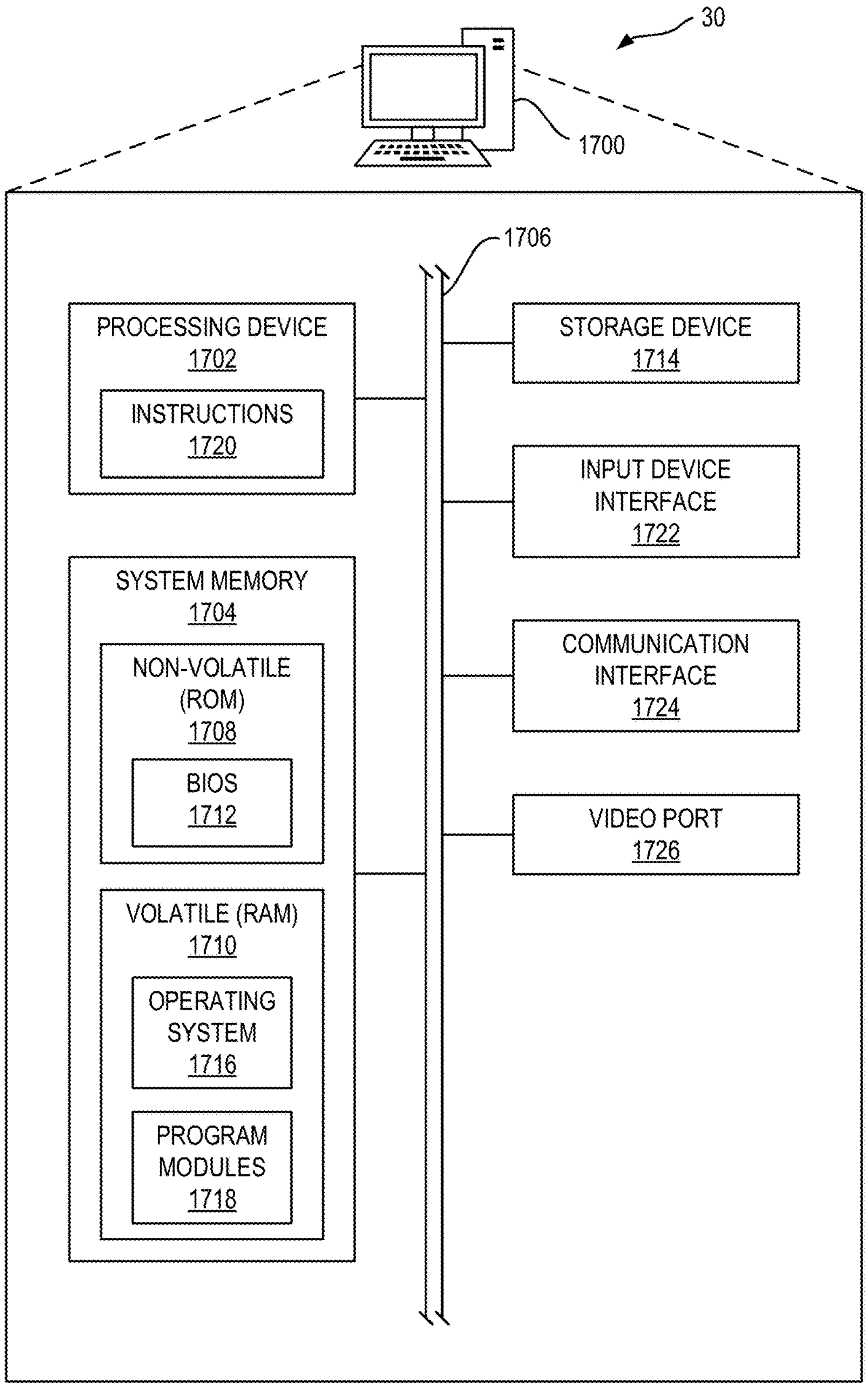
FIG. 17 is a block diagram of a computer system suitable for operating an LIS according to embodiments disclosed herein.

FIG. 17 is a block diagram of a computer system 1700 suitable for operating an LIS according to embodiments disclosed herein. The computer system 1700 comprises any computing or electronic device capable of including firmware, hardware, and/or executing software instructions that could be used to perform any of the methods or functions described above, such as implementing the compressive sensing or deep learning-based approaches to resolving a reflection beamforming matrix. The computer system 1700 may be implemented in the LIS controller 30 of FIGS. 2 and 4, in a network server (e.g., an application server of a cellular network), in a server at a network edge, in a cloud server, or a combination of these. In this regard, the computer system 1700 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 1700 in this embodiment includes a processing device 1702 or processor, a system memory 1704, and a system bus 1706. The system memory 1704 may include non-volatile memory 1708 and volatile memory 1710. The non-volatile memory 1708 may include read-only memory (ROM), erasable programmable read-only memory (EPROM), electrically erasable programmable read-only memory (EEPROM), and the like. The volatile memory 1710 generally includes random-access memory (RAM) (e.g., dynamic random access memory (DRAM), such as synchronous DRAM (SDRAM)). A basic input/output system (BIOS) 1712 may be stored in the non-volatile memory 1708 and can include the basic routines that help to transfer information between elements within the computer system 1700.

The system bus 1706 provides an interface for system components including, but not limited to, the system memory 1704 and the processing device 1702. The system bus 1706 may be any of several types of bus structures that may further interconnect to a memory bus (with or without a memory controller), a peripheral bus, and/or a local bus using any of a variety of commercially available bus architectures.

The processing device 1702 represents one or more commercially available or proprietary general-purpose processing devices, such as a microprocessor, central processing unit (CPU), or the like. More particularly, the processing device 1702 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 1702 is configured to execute processing logic instructions for performing the operations and steps discussed herein.

In this regard, the various illustrative logical blocks, modules, and circuits described in connection with the embodiments disclosed herein may be implemented or performed with the processing device 1702, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing device 1702 may be a microprocessor, or may be any conventional processor, controller, microcontroller, or state machine. The processing device 1702 may also be implemented as a combination of computing devices (e.g., a combination of a DSP and a microprocessor, a plurality of microprocessors, one or more microprocessors in conjunction with a DSP core, or any other such configuration).

The computer system 1700 may further include or be coupled to a non-transitory computer-readable storage medium, such as a storage device 1714, which may represent an internal or external hard disk drive (HDD), flash memory, or the like. The storage device 1714 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing methods of the disclosed embodiments.

An operating system 1716 and any number of program modules 1718 or other applications can be stored in the volatile memory 1710, wherein the program modules 1718 represent a wide array of computer-executable instructions corresponding to programs, applications, functions, and the like that may implement the functionality described herein in whole or in part, such as through instructions 1720 on the processing device 1702. The program modules 1718 may also reside on the storage mechanism provided by the storage device 1714. As such, all or a portion of the functionality described herein may be implemented as a computer program product stored on a transitory or non-transitory computer-usable or computer-readable storage medium, such as the storage device 1714, volatile memory 1710, non-volatile memory 1708, instructions 1720, and the like. The computer program product includes complex programming instructions, such as complex computer-readable program code, to cause the processing device 1702 to carry out the steps necessary to implement the functions described herein.

An operator, such as the user, may also be able to enter one or more configuration commands to the computer system 1700 through a keyboard, a pointing device such as a mouse, or a touch-sensitive surface, such as the display device, via an input device interface 1722 or remotely through a web interface, terminal program, or the like via a communication interface 1724. The communication interface 1724 may be wired or wireless and facilitate communications with any number of devices via a communications network in a direct or indirect fashion. An output device, such as a display device, can be coupled to the system bus 1706 and driven by a video port 1726. Additional inputs and outputs to the computer system 1700 may be provided through the system bus 1706 as appropriate to implement embodiments described herein.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for operating a large intelligent surface (LIS), the method comprising:

configuring the LIS with an array of passive reconfigurable reflecting elements and a plurality of active sparse channel sensing elements;

operating the plurality of active sparse channel sensing elements among the array of passive reconfigurable reflecting elements in a channel sensing mode, wherein each of the array of passive reconfigurable reflecting elements has a reconfigurable phase state; and adjusting the corresponding phase states of the plurality of passive reconfigurable reflecting elements based on output of the channel sensing mode.

2. The method of claim 1, further comprising:

operating the plurality of active sparse channel sensing elements in a reflection mode based on the output of the channel sensing mode.

3. The method of claim 1, further comprising:

receiving sensor data from at least one of a video sensor, an audio sensor, a radar sensor, or a proximity sensor, wherein adjusting the plurality of passive reconfigurable reflecting elements is further based on the sensor data.

4. The method of claim 1, wherein operating the plurality of active sparse channel sensing elements in the channel sensing mode comprises:

receiving one or more sampled channel vectors; and determining controllable parameters of the plurality of passive reconfigurable reflecting elements from the one or more sampled channel vectors.

5. The method of claim 4, further comprising:

determining the controllable parameters based on extrapolating channels for some or all of the plurality of passive reconfigurable reflecting elements using sampled channels of the plurality of active sparse channel sensing elements.

6. The method of claim 4, further comprising:

determining the controllable parameters based on compressive sensing.

7. The method of claim 4, further comprising:

determining the controllable parameters based on artificial intelligence.

8. The method of claim 7, wherein the artificial intelligence comprises a deep learning algorithm implemented on a neural network and configured to resolve a reflection beamforming vector for the plurality of passive reconfigurable reflecting elements.

9. The method of claim 8, further comprising:

pre-training the deep learning algorithm to learn an environment around the LIS.

10. The method of claim 1, further comprising:

coupling the LIS to the plurality of active sparse channel sensing elements with one or more radio frequency (RF) chains.

11. The method of claim 10, further comprising:

selectively connecting each of the plurality of active sparse channel sensing elements is to a corresponding RF chain, wherein each of the plurality of active sparse channel sensing elements is operable in a passive reflection mode when disconnected from the corresponding RF chain.

12. The method of claim 11, further comprising:

adjusting the plurality of active sparse channel sensing elements when in the passive reflection mode using a reflection matrix.

13. The method of claim 12, further comprising:

coupling the LIS to one or more sensors; and resolving the reflection matrix based on input from the plurality of active sparse channel sensing elements and the one or more sensors.

14. The method of claim 1, wherein the array of passive reconfigurable reflecting elements comprises multiple collocated groups of passive reconfigurable reflecting elements.

15. The method of claim 10, wherein the array of passive reconfigurable reflecting elements comprises multiple distributed groups of passive reconfigurable reflecting elements.

16. The method of claim 10, further comprising:

estimating a wireless channel using the plurality of active sparse channel sensing elements;

adjusting the reconfigurable phase state of each of the array of passive reconfigurable reflecting elements based on the estimated wireless channel; and resolving a reflection matrix for the reconfigurable phase state of each of the array of passive reconfigurable reflecting elements to facilitate wireless communication over the estimated wireless channel using a deep learning algorithm trained using past inputs from the plurality of active sparse channel sensing elements, wherein the plurality of active sparse channel sensing elements is fewer in number than the array of passive reconfigurable reflecting elements.

17. The method of claim 1, wherein each of the array of passive reconfigurable reflecting elements comprises a corresponding reconfigurable radio frequency (RF) phase shifter.

18. The method of claim 11, wherein each of the plurality of active sparse channel sensing elements comprises a corresponding reconfigurable RF phase shifter.

19. The method of claim 18, wherein each of the plurality of active sparse channel sensing elements is operable in an active sensing mode and a passive reflection mode.

20. The method of claim 19, wherein in the active sensing mode, each of the plurality of active sparse channel sensing elements is connected to a corresponding RF chain, and in the passive reflection mode, each of the plurality of active sparse channel sensing elements is connected to the corresponding RF phase shifter and disconnected from the corresponding RF chain.

* * * * *